US012591726B2

(12) United States Patent
Do et al.

(10) Patent No.: US 12,591,726 B2
(45) Date of Patent: Mar. 31, 2026

(54) INTEGRATED CIRCUIT INCLUDING STANDARD CELL AND METHOD OF DESIGNING THE INTEGRATED CIRCUIT

(71) Applicant: Samsung Electronics Co., Ltd., Suwon-si (KR)

(72) Inventors: Jungho Do, Hwaseong-si (KR); Jisu Yu, Seoul (KR); Hyeongyu You, Hwaseong-si (KR); Minjae Jeong, Yongin-si (KR); Yujin Pyo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 17/818,080

(22) Filed: Aug. 8, 2022

(65) Prior Publication Data

US 2023/0049882 A1     Feb. 16, 2023

(30) Foreign Application Priority Data

Aug. 13, 2021     (KR) ......................... 10-2021-0107533

(51) Int. Cl.
*G06F 30/392* (2020.01)
*G06F 30/394* (2020.01)
*G06F 119/06* (2020.01)

(52) U.S. Cl.
CPC .......... *G06F 30/392* (2020.01); *G06F 30/394* (2020.01); *G06F 2119/06* (2020.01)

(58) Field of Classification Search
USPC ........................................................ 716/119
See application file for complete search history.

(56) References Cited

U.S. PATENT DOCUMENTS

| | | | |
|---|---|---|---|
| 7,895,551 B2 | 2/2011 | Shah et al. | |
| 8,431,968 B2 | 4/2013 | Lu et al. | |
| 8,582,340 B2 | 11/2013 | Chong et al. | |
| 8,694,945 B2 | 4/2014 | Wang et al. | |
| 8,941,150 B2 | 1/2015 | Sherlekar et al. | |
| 9,035,361 B2 | 5/2015 | Lu et al. | |
| 9,639,650 B2 | 5/2017 | Yuan et al. | |
| 10,002,860 B2 | 6/2018 | Azmat | |
| 10,242,946 B2 | 3/2019 | Lin et al. | |
| 10,394,299 B2 | 8/2019 | Raj et al. | |
| 10,622,306 B2 | 4/2020 | Liaw | |
| 10,748,889 B2 | 8/2020 | Berzins et al. | |
| 2017/0213847 A1* | 7/2017 | Nebesnyi | G06F 30/20 |
| 2018/0018419 A1 | 1/2018 | Rowhani et al. | |
| 2018/0358345 A1* | 12/2018 | Qian | G06F 30/392 |
| 2019/0155984 A1* | 5/2019 | Chen | G06F 30/398 |

(Continued)

FOREIGN PATENT DOCUMENTS

KR     10-2013-0129450 A     11/2013

*Primary Examiner* — Mohammed Alam

(74) *Attorney, Agent, or Firm* — Wolf, Greenfield & Sacks, P.C.

(57)     ABSTRACT

An integrated circuit includes a plurality of standard cells including first and second standard cells arranged adjacent to each other in a first direction, and first, second, and third metal layers sequentially stacked in a vertical direction. At least one power segment is arranged adjacent a region where at least one of the first standard cell and the second standard cell is arranged. The at least one power segment is configured to provide power to the plurality of standard cells and is formed as a pattern of the third metal layer extending in a second direction.

20 Claims, 28 Drawing Sheets

(56) References Cited

U.S. PATENT DOCUMENTS

| 2020/0020464 | A1 | 1/2020 | Frederick et al. | |
| 2020/0082045 | A1* | 3/2020 | Lee | G06F 30/398 |
| 2020/0243502 | A1* | 7/2020 | Kim | H10D 89/10 |
| 2020/0279069 | A1 | 9/2020 | Kumar et al. | |
| 2021/0334449 | A1* | 10/2021 | Yu | G06F 30/392 |

* cited by examiner

: Super via

VDD

GND

VDD

GND

| | : PL |
|---|---|
| | : M3 |
| | : Cell boundary |

INTEGRATED CIRCUIT INCLUDING STANDARD CELL AND METHOD OF DESIGNING THE INTEGRATED CIRCUIT

CROSS-REFERENCE TO RELATED APPLICATION

This application is based on and claims priority under 35 U.S.C. § 119 to Korean Patent Application No. 10-2021-0107533, filed on Aug. 13, 2021, in the Korean Intellectual Property Office, the disclosure of which is incorporated by reference herein in its entirety.

FIELD

The inventive concept relates to an integrated circuit, and more particularly, to an integrated circuit including a standard cell and a method of designing the integrated circuit.

BACKGROUND

Integrated circuits may be designed based on standard cells. According to the miniaturization of semiconductor manufacturing processes, the size of patterns in a standard cell may decrease, and the size of the standard cell may also decrease. Accordingly, the size or arrangement of patterns in a standard cell, which can affect the efficiency of metal resource utilization, the size of the standard cell, etc., may be important.

SUMMARY

The inventive concept provides an integrated circuit including a standard cell, which may efficiently use metal resources by including a power segment, and a method of designing the integrated circuit.

The inventive concept is not limited to the matters mentioned above, and the inventive concept that has not been mentioned herein will be clearly understood by one of ordinary skill in the art from the following description.

According to an aspect of the inventive concept, there is provided an integrated circuit including: a plurality of standard cells including first and second standard cells arranged adjacent to each other in a first direction; and first, second, and third metal layers sequentially stacked in a vertical direction, wherein at least one power segment is arranged in a region where at least one of the first standard cell or the second standard cell is arranged, and the at least one power segment is configured to provide power to the plurality of standard cells and comprises a pattern of the third metal layer extending in a second direction.

According to another aspect of the inventive concept, there is provided a method of fabricating an integrated circuit, the method including: arranging a plurality of standard cells; arranging a plurality of power lines that are patterns configured to transmit power to the plurality of standard cells; replacing a portion of one or more of the plurality of power lines with a signal segment configured to transmit signals to the plurality of standard cells; and fabricating the integrated circuit comprising the plurality of standard cells and the signal segment.

According to another aspect of the inventive concept, there is provided an integrated circuit including: a plurality of standard cells; and a plurality of tracks on which a plurality of patterns extending in a first direction are provided, the plurality of tracks being spaced apart from each other in a second direction, wherein a first track among the plurality of tracks comprises a power segment and a signal segment, the power segment is configured to transmit power and comprises a pattern provided in a first portion of the first track, and the signal segment is configured to transmit signals and comprises a pattern provided in a second portion of the first track.

BRIEF DESCRIPTION OF THE DRAWINGS

Embodiments of the inventive concept will be more clearly understood from the following detailed description taken in conjunction with the accompanying drawings in which:

FIGS. 6A and 6B are diagrams illustrating a layout of an integrated circuit according to an example embodiment of the inventive concept;

FIGS. 8A, 8B, 8C, and 8D are diagrams illustrating a layout of an integrated circuit according to an example embodiment of the inventive concept;

DETAILED DESCRIPTION OF EMBODIMENTS

Hereinafter, embodiments of the inventive concept will be described with reference to the accompanying drawings.

FIGS. 1A to 1D are diagrams illustrating an integrated circuit according to an example embodiment of the inventive concept.

Figure 1A:
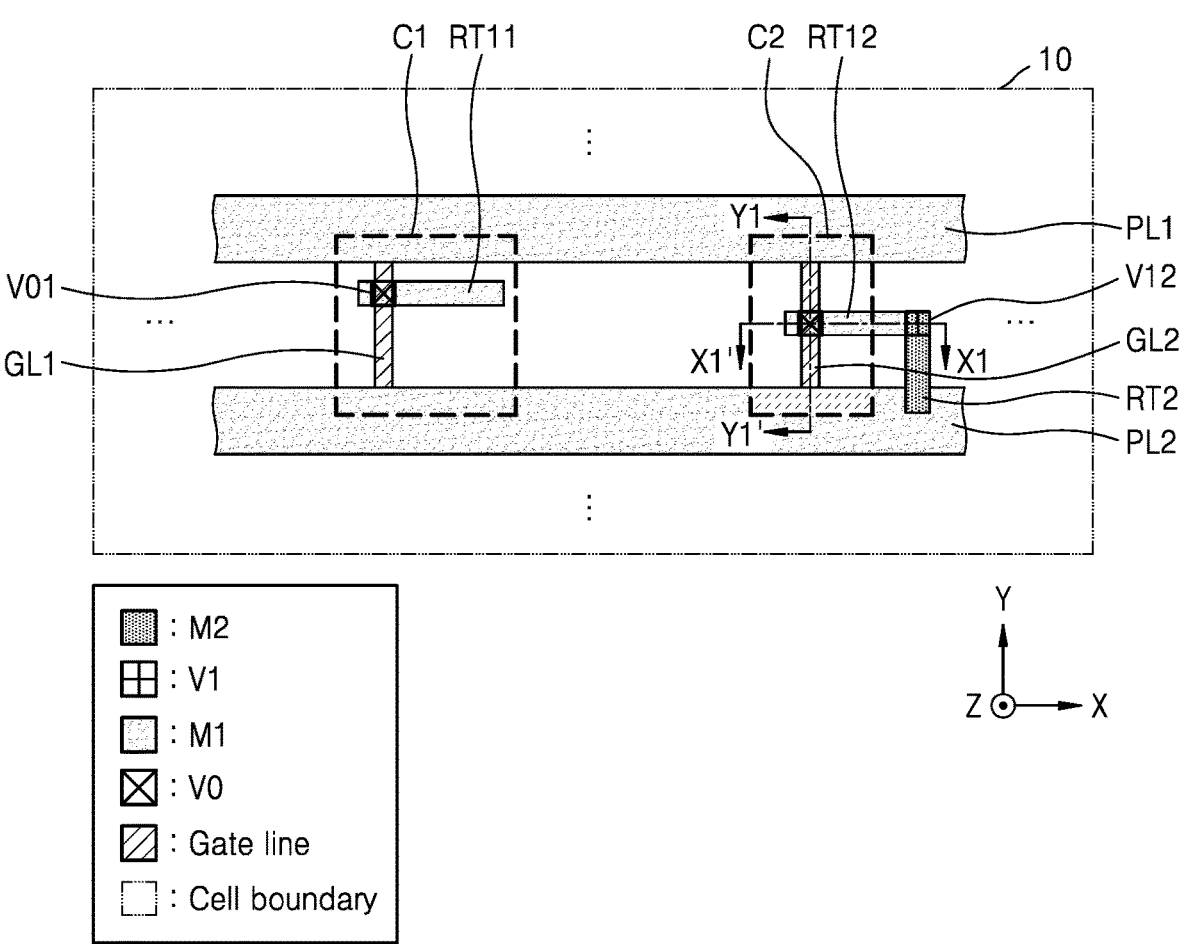
FIGS. 1A, 1B, 1C, and 1D are diagrams illustrating an integrated circuit according to an example embodiment of the inventive concept.

FIG. 1A is a plan view illustrating a portion of an integrated circuit 10 constituting one chip or one functional block on a plane including an X-axis and a Y-axis. Herein, an X-axis direction and a Y-axis direction may be referred to as a first horizontal direction and a second horizontal direction, respectively, and a Z-axis direction may be referred to as a vertical direction. The terms first, second, third, etc. may be used herein merely to distinguish one element, layer, direction, etc., from another. A plane including the X-axis and the Y-axis may be referred to as a horizontal plane, a component arranged in the +Z-axis direction relative to another component may be referred to as being over the other component, and a component arranged in the –Z-axis direction relative to another component may be referred to as being under the other component.

Referring to FIG. 1A, the integrated circuit 10 may include a plurality of standard cells. A standard cell may be a unit of a layout included in an integrated circuit, may be designed to perform a predefined function, and may be referred to as a cell. The integrated circuit 10 may include a plurality of various standard cells, and the standard cells may be aligned along a plurality of rows.

The plurality of standard cells may be repeatedly used in an integrated circuit design. The standard cells may be predesigned according to manufacturing technology and stored in a standard cell library, and an integrated circuit may be designed by arranging and interconnecting the standard cells stored in the standard cell library according to a design rule.

For example, the standard cells may include various basic circuits such as inverters, AND gates, NAND gates, OR gates, XOR gates, and NOR gates, which are frequently used in digital circuit designs for electronic apparatuses, such as central processing unit (CPU), graphics processing unit (GPU), and system-on-chip (SOC) designs. Alternatively, for example, the standard cells may include other circuits frequently used in circuit blocks, such as flip-flops and latches.

The standard cells may include a filler cell. The filler cell may be arranged adjacent to a functional cell to provide routing of signals provided to or output from the functional cell. In addition, the filler cell may be a cell used to fill a space remaining after functional cells are arranged.

The standard cells may include an active region and a gate line. The active region and the gate line included in the standard cell may form a transistor. In an example embodiment, the gate line may include a work function metal-containing layer and a gap-fill metal layer. For example, the work function metal-containing layer may include at least one metal among Ti, W, Ru, Nb, Mo, Hf, Ni, Co, Pt, Yb, Tb, Dy, Er, and Pd, and the gap-fill metal layer may include a W layer or an Al layer. In an example embodiment, the gate line may include a stack structure of TiAlC/TiN/W, a stack structure of TiN/TaN/TiAlC/TiN/W, or a stack structure of TiN/TaN/TiN/TiAlC/TiN/W.

The integrated circuit 10 may include metal layers in which lines for interconnecting the standard cells are formed. For example, a second metal layer M2 may be formed over a first metal layer M1. In an example embodiment, the first metal layer M1 may include patterns extending in the X-axis direction, and the second metal layer M2 may include patterns extending in the Y-axis direction (uni-direction). In addition, a third metal layer may be further formed over the second metal layer M2, that is, with the second metal layer M2 between the third metal layer and the first metal layer M1.

The patterns formed in each of the metal layers may include a metal, a conductive metal nitride, a metal silicide, or a combination thereof. In the drawings herein, only some layers may be shown for convenience of illustration, and to indicate an electrical connection between a pattern of a metal layer and a lower pattern, a via may be shown even though the via is located under the pattern of the metal layer. It will be understood that a boundary as described herein may not require a physical structure, but may refer to a periphery of a respective cell or group of cells, and may also be referred to as a cell boundary. In some embodiments, a cell boundary may be between cells comprising elements (e.g., power segments as described herein) that are electrically connected to different patterns of one or more underlying metal layers. Elements referred to as "adjacent" a cell boundary may extend at or along the cell boundary, or may be within or inside the cell boundary.

A first power line PL1 and a second power line PL2 for supplying a voltage to each of the standard cells may be formed at a boundary of each of the plurality of rows. The first power line PL1 may provide a first supply voltage (e.g., a power voltage VDD) to each of the standard cells, and the second power line PL2 may provide a second supply voltage (e.g., a ground voltage VSS) to each of the standard cells. The first power line PL1 and the second power line PL2 may be formed as a conductive pattern extending in the X-axis direction, and may be alternately arranged in the Y-axis direction.

Figure 1B:
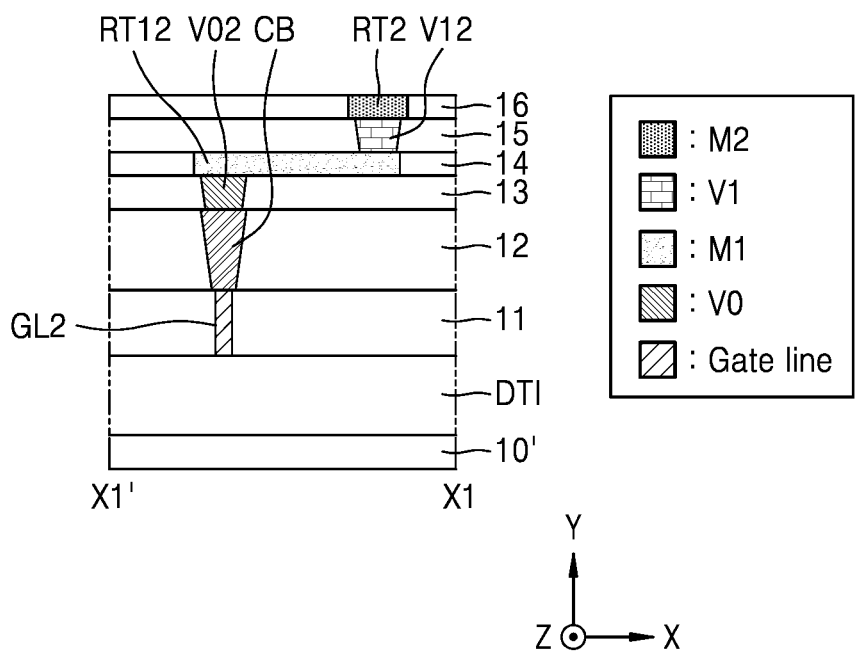
Figure 1C:
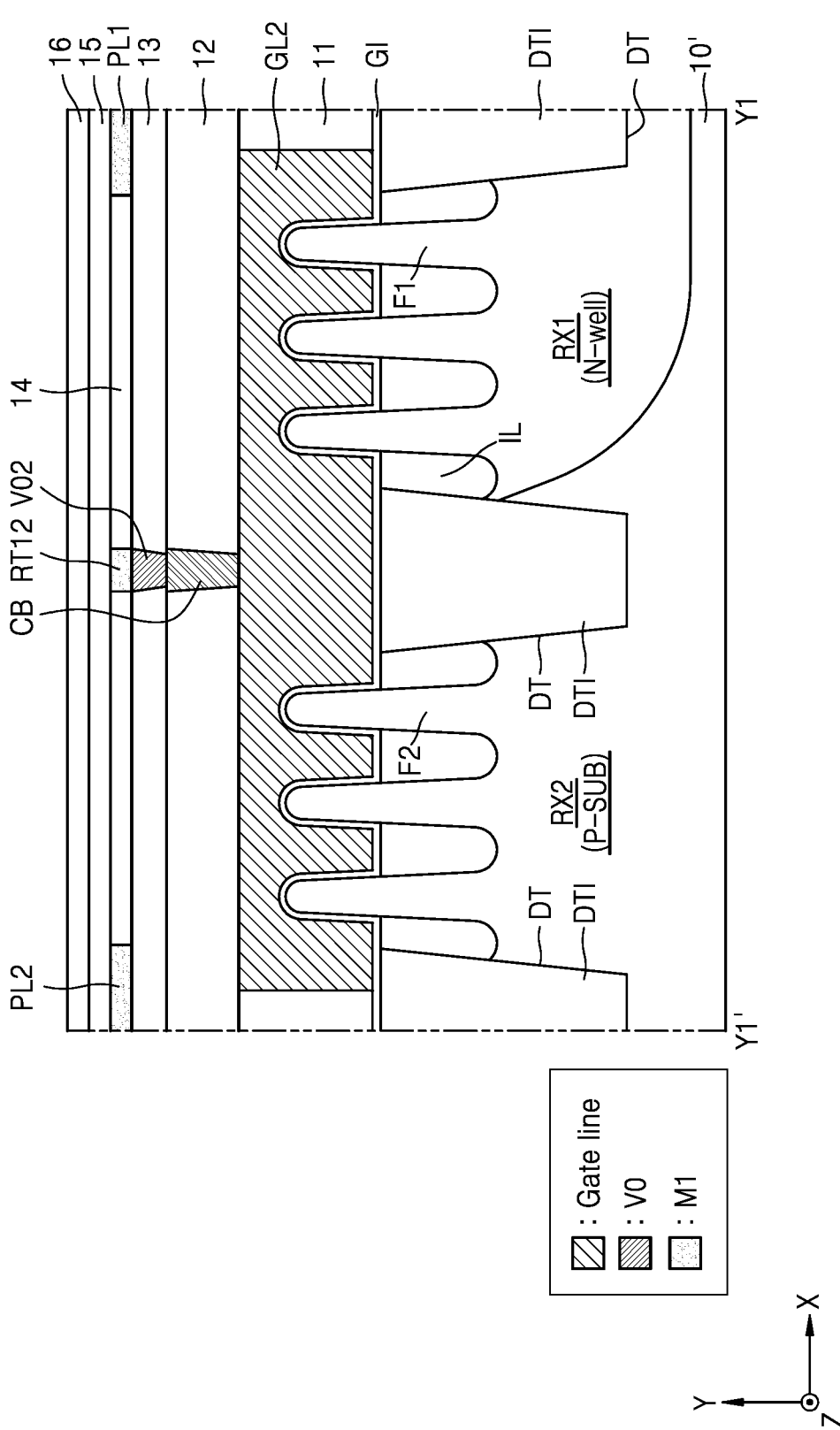
Figure 1D:
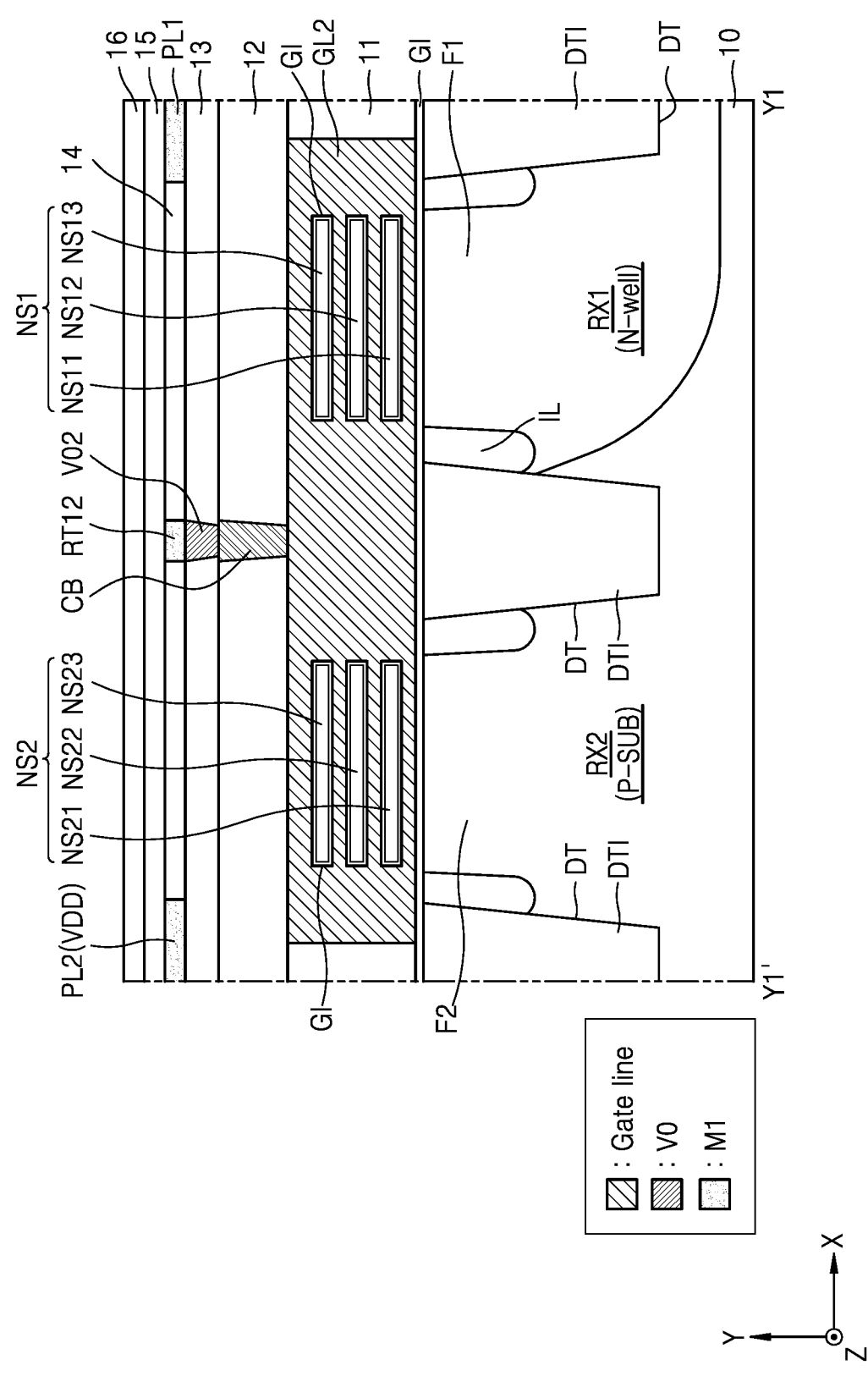

FIG. 1B is a cross-sectional view taken along line X1-X1' of FIG. 1A, and FIGS. 1C and 1D are cross-sectional views taken along line Y1-Y1' of FIG. 1A. Although not illustrated in FIGS. 1B to 1D, a gate spacer may be formed on a side surface of a gate line, and a barrier layer may be formed on a surface of a contact and/or a via.

FIG. 1C illustrates an example in which a plurality of fins are formed in an active region, and FIG. 1D illustrates an example in which a nanosheet is formed in an active region. However, the standard cell included in the integrated circuit according to the inventive concept are not limited to those illustrated in FIGS. 1C and 1D. For example, in the standard cell, a gate-all-around (GAA) field effect transistor (FET) in which a nanowire formed over an active region is surrounded by a gate line may be formed, and a vertical GAA FET in which a plurality of nanowires are vertically stacked over an active region and the plurality of nanowires are surrounded by a gate line may be formed. For example, in the standard cell, a multi-bridge channel (MBC) FET in which a plurality of nanosheets are stacked over an active region and a gate line surrounds the plurality of nanosheets may be formed. In addition, for example, a negative capacitance (NC) FET may be formed in the active region. In addition to examples of the transistors described above, various transistors (e.g., complementary FET (CFET), negative capacitance FET (NCFET), carbon nanotube (CNT) FET, bipolar junction transistors, and other three-dimensional transistors) may be formed on the gate line and in the active region.

Referring to FIGS. 1B and 1C, a substrate 10' may include a semiconductor such as silicon (Si) or germanium (Ge), or a Group III-V compound such as GaAs, AlGaAs, InAs, InGaAs, InSb, GaSb, InGaSb, InP, GaP, InGaP, InN, GaN, or InGaN. In an example embodiment, the substrate 10' may be a silicon-on-insulator (SOI) substrate or a germanium-on-insulator (GOI) substrate. In an example embodiment, the substrate 10' may be doped with P-type impurities.

A first active region RX1 and a second active region RX2 may be formed in the substrate 10'. In an example embodiment, the second active region RX2 may be formed in the substrate 10' (P-SUB) doped with P-type impurities, and the first active region RX1 may be formed in an N-well formed in the substrate 10'. The first active region RX1 may form a gate line GL2 and a P-type transistor, and the second active region RX2 may form a gate line GL2 and an N-type transistor.

An isolation trench DT may be formed between the first active region RX1 and the second active region RX2. A device isolating layer DTI may be formed by filling an insulating material (e.g., oxide) inside the isolation trench DT. The first active region RX1 and the second active region RX2 may be isolated from each other by the device isolating layer DTI. Also, under the first power line PL1 and the second power line PL2, an isolation trench DT may be formed, and a device isolating layer DTI may be formed.

A plurality of first fins F1 and a plurality of second fins F2 may extend parallel to each other in the X-axis direction. A device insulating layer IL (e.g., oxide) may be formed between the plurality of first fins F1 and the plurality of second fins F2. In the first active region RX1 and the second active region RX2, the plurality of first fins F1 and the plurality of second fins F2 may protrude in a fin shape over the device insulating layer IL. FIG. 1C illustrates that three first fins F1 and three second fins F2 are formed, but the inventive concept is not limited thereto, and the number of fins formed in the first active region RX1 and the second active region RX2 may be variously modified.

A gate insulating layer GI and the gate line GL2 may be formed to extend in the Y-axis direction. The gate insulating layer GI and the gate line GL2 may cover an upper surface and both sidewalls of each of the plurality of first fins F1 and the plurality of second fins F2, an upper surface of the device insulating layer IL, and an upper surface of the device isolating layer DTI.

First to sixth interlayer insulating layers 11 to 16 may be formed over the plurality of first fins F1 and the plurality of second fins F2. An active contact and an active via may be formed through the first interlayer insulating layer 11 to connect a source/drain region to a pattern of the first metal layer M1.

A gate contact CB may be connected to the gate line GL2 through a second interlayer insulating layer 12, and a gate via V02 may connect the gate contact CB to a first routing line RT12 through a third interlayer insulating layer 13. The first routing line RT12 may be formed as a pattern of the first metal layer M1, and the gate via V02 may be formed as a first via V0 electrically connected under the first metal layer M1. Accordingly, the first routing line RT12 may be electrically connected to the gate line GL2 through the gate via V02 and the gate contact CB.

A second via V12 connecting the first routing line RT12 to a second routing line RT2 may be formed as a second via V1 formed through a fifth interlayer insulating layer 15. The second routing line RT2 may be formed as a pattern of the second metal layer M2 that is an upper layer of the first metal layer M1.

Referring to FIG. 1D, in an example embodiment, a nanosheet that is an active region may be formed over each of the first active region RX1 and the second active region RX2. A first nanosheet stack NS1 may be formed over the first active region RX1, and a second nanosheet stack NS2 may be formed over the second active region RX2. Each of the first nanosheet stack NS1 and the second nanosheet stack NS2 may extend in the X-axis direction.

The first nanosheet stack NS1 and the second nanosheet stack NS2 may function as a channel of a transistor. For example, the first nanosheet stack NS1 may be doped with N-type impurities, and may form a P-type transistor. On the other hand, the second nanosheet stack NS2 may be doped with P-type impurities, and may form an N-type transistor. In an example embodiment, the first nanosheet stack NS1 and the second nanosheet stack NS2 may include Si, Ge, or SiGe. In an example embodiment, the first nanosheet stack NS1 and the second nanosheet stack NS2 may include InGaAs, InAs, GaSb, InSb, or a combination thereof.

The first nanosheet stack NS1 and the second nanosheet stack NS2 may respectively include a plurality of nanosheets NS11 to NS13 and NS21 to NS23 overlapping each other in the vertical direction (Z-axis direction) over the upper surfaces of the first fins F1 and the second fins F2. In the present embodiment, a case where each of the first nanosheet stack NS1 and the second nanosheet stack NS2 includes three nanosheets is illustrated, but the inventive concept is not limited thereto. For example, each of the first nanosheet stack NS1 and the second nanosheet stack NS2 may include at least two nanosheets, and the number of nanosheets is not particularly limited.

The gate line GL2 may cover the first nanosheet stack NS1 and the second nanosheet stack NS2 over the first fin F1 and the second fin F2, and may surround each of the plurality of nanosheets NS11 to NS13 and NS21 to NS23. The plurality of nanosheets NS11 to NS13 and NS21 to NS23 may have a GAA structure surrounded by the gate line GL2. The gate insulating layer GI may be arranged between the first nanosheet stack NS1 and the second nanosheet stack NS2 and the gate line GL2.

Figure 2:
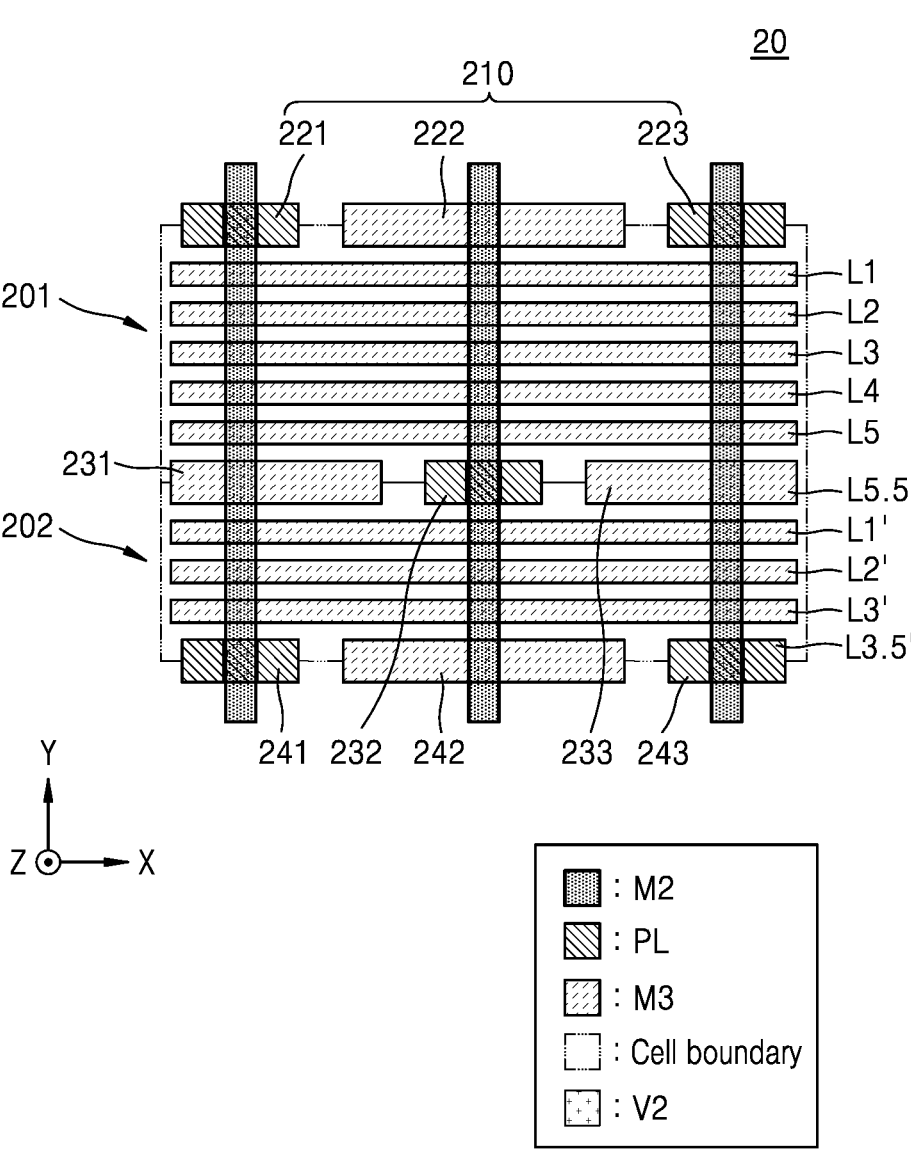
FIG. 2 is a diagram illustrating a layout of an integrated circuit according to an example embodiment of the inventive concept.

FIG. 2 is a diagram illustrating a plan view layout of an integrated circuit according to an example embodiment of the inventive concept.

Referring to FIG. 2, an integrated circuit 20 according to an example embodiment of the inventive concept may include a plurality of standard cells. For example, the integrated circuit 20 may include a first standard cell 201 and a second standard cell 202. A cell height of the first standard cell 201 may be different from a cell height of the second standard cell 202.

In addition, the integrated circuit 20 may include a plurality of metal layers, and FIG. 2 illustrates a second metal layer M2 and a third metal layer M3 among the plurality of metal layers.

The integrated circuit 20 may include a plurality of tracks for each of the plurality of metal layers, and may include patterns extending in a certain direction along the plurality of tracks. For example, the integrated circuit 20 may include patterns 210 extending in the Y-axis direction from the second metal layer M2, and may include patterns L1 to L5.5 and L1' to L3.5' extending in the X-axis direction from the third metal layer M3.

At least one of a power line that is a pattern for transmitting power and a signal line that is a pattern for transmitting signals may be arranged on the plurality of tracks. For example, the first standard cell 201 may include signal lines L1 to L5 in the third metal layer M3. In addition, the second standard cell 202 may include signal lines L1' to L3' in the third metal layer M3.

The integrated circuit 20 may include a plurality of standard cells including the first and second standard cells 201 and 202 arranged adjacent to each other in a first direction (e.g., Y-axis direction), and may include the first to third metal layers M1 to M3 sequentially stacked in the vertical direction. In addition, at least one power segment that provides power to the plurality of standard cells and is formed as a pattern of the third metal layer M3 extending in a second direction (e.g., X-axis direction) may be arranged inside a region where at least one of the first standard cell 201 and the second standard cell 202 is arranged. A power line may represent a pattern extending longer than a power segment in the second direction (e.g., X-axis direction). Widths of patterns of the plurality of tracks in the second direction may be different from each other. In detail, a width in the second direction of patterns of second tracks among the plurality of tracks may be different from a width in the second direction of patterns of a first track among the plurality of tracks.

The integrated circuit 20 may include, in the third metal layer M3, power segments 221, 223, 232, 241, and 243 that provide power to the plurality of standard cells and are patterns formed in a portion of a track, and signal segments 222, 231, 233, and 242 that transmit signals and are patterns formed in a portion of a track. A signal line may represent a pattern extending longer than a signal segment in the second direction (e.g., X-axis direction).

Both a power segment and a signal segment may be formed on at least one track among the plurality of tracks. For example, the power segments 221 and 223 and the signal segment 222 may be arranged on a track, the power segment 232 and the signal segments 231 and 233 may be arranged on another track, and the power segments 241 and 243 and the signal segment 242 may be arranged on another track. Because the integrated circuit 20 includes tracks on which both a power segment and a signal segment are arranged, space may be used efficiently, and thus, an area of the integrated circuit 20 may be reduced, compared to a case where a power segment or a signal segment is not included.

When only a power line or a signal line is formed on a track, the track may be referred to as a power track or a signal track. In addition, when a power segment or a signal segment is formed on a track, the track may be referred to as a power-signal track. For example, when tracks in a standard cell are referred to in order, signal tracks L1 to L5 and a power-signal track L5.5 may be arranged in a region where the first standard cell 201 is arranged. In addition, signal tracks L1' to L3' and a power-signal track L3.5' may be arranged in a region where the second standard cell 202 is arranged. The power-signal tracks L5.5 and/or L3.5' may be arranged along or adjacent respective boundaries of the cells 201 and 202. The number of tracks formed in a region where a plurality of cells are arranged is not limited thereto, and the number of tracks may vary.

A pitch (width in the Y-axis direction) of a signal line, a pitch of a power line, a pitch of a signal segment, and/or a pitch of a power segment included in the integrated circuit 20 may be the same as or different from each other. For example, as illustrated in FIG. 2, a pitch of the power segments 221, 223, 232, 241, and 243 and a pitch of the signal segments 222, 231, 233, and 242 may be greater than a pitch of the signal lines, but are not limited thereto.

Figure 3:
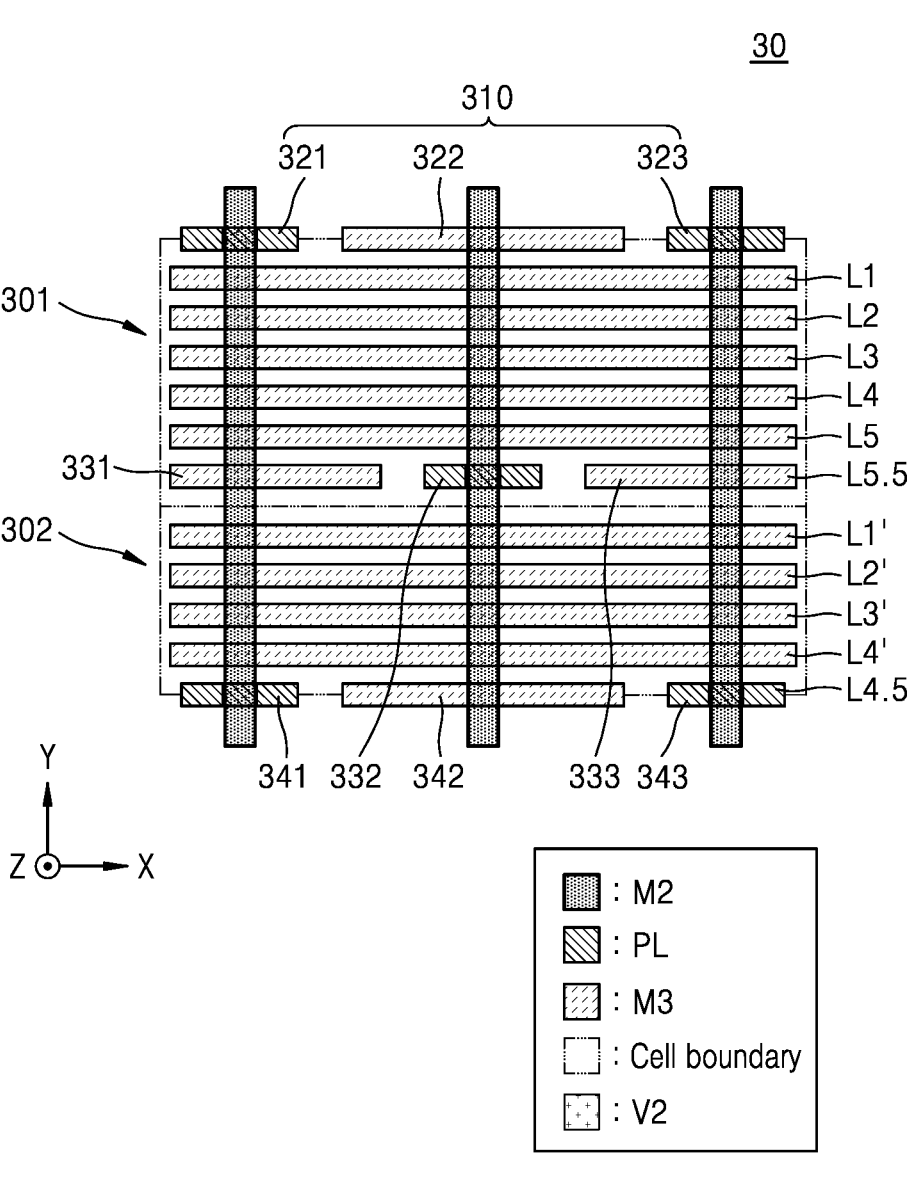
FIG. 3 is a diagram illustrating a layout of an integrated circuit according to an example embodiment of the inventive concept.

FIG. 3 is a diagram illustrating a plan view layout of an integrated circuit according to an example embodiment of the inventive concept.

Referring to FIG. 3, an integrated circuit 30 according to an example embodiment of the inventive concept may include a first standard cell 301 and a second standard cell 302. The integrated circuit 30 may include patterns 310 extending from the second metal layer M2 and patterns extending from the third metal layer M3.

The power-signal track L5.5 including a power segment and a signal segment may be formed inside a region where at least one of the first standard cell 301 and the second standard cell 302 is arranged. For example, in contrast to the integrated circuit 20 of FIG. 2 in which the power segment 232 is arranged at or along a boundary between the first standard cell 201 and the second standard cell 202, the integrated circuit 30 of FIG. 3 may include a power segment 332 and signal segments 331 and 333 which are formed as patterns of the third metal layer M3 inside a region where the first standard cell 301 is arranged, that is within a boundary of the cell 301 rather than at or along the boundary between the first standard cell 301 and the second standard cell 302. A pitch (width in the Y-axis direction) of the power segment 332 and a pitch of the signal segments 331 and 333 in the first standard cell 301 may be less than a pitch of a power line, but are not limited thereto.

Accordingly, because the integrated circuit 30 according to the inventive concept includes the power segment 332 and the signal segments 331 and 333, which are formed on the power-signal track L5.5 of the third metal layer M3 inside the region where the first standard cell 301 is arranged, a large space for routing for electrically connecting a plurality of standard cells to each other may be secured. Accordingly, a greater number of signal lines, power lines, signal segments, and/or power segments may be included, compared to a case where a power segment is formed at a boundary between standard cells.

Figure 4A:
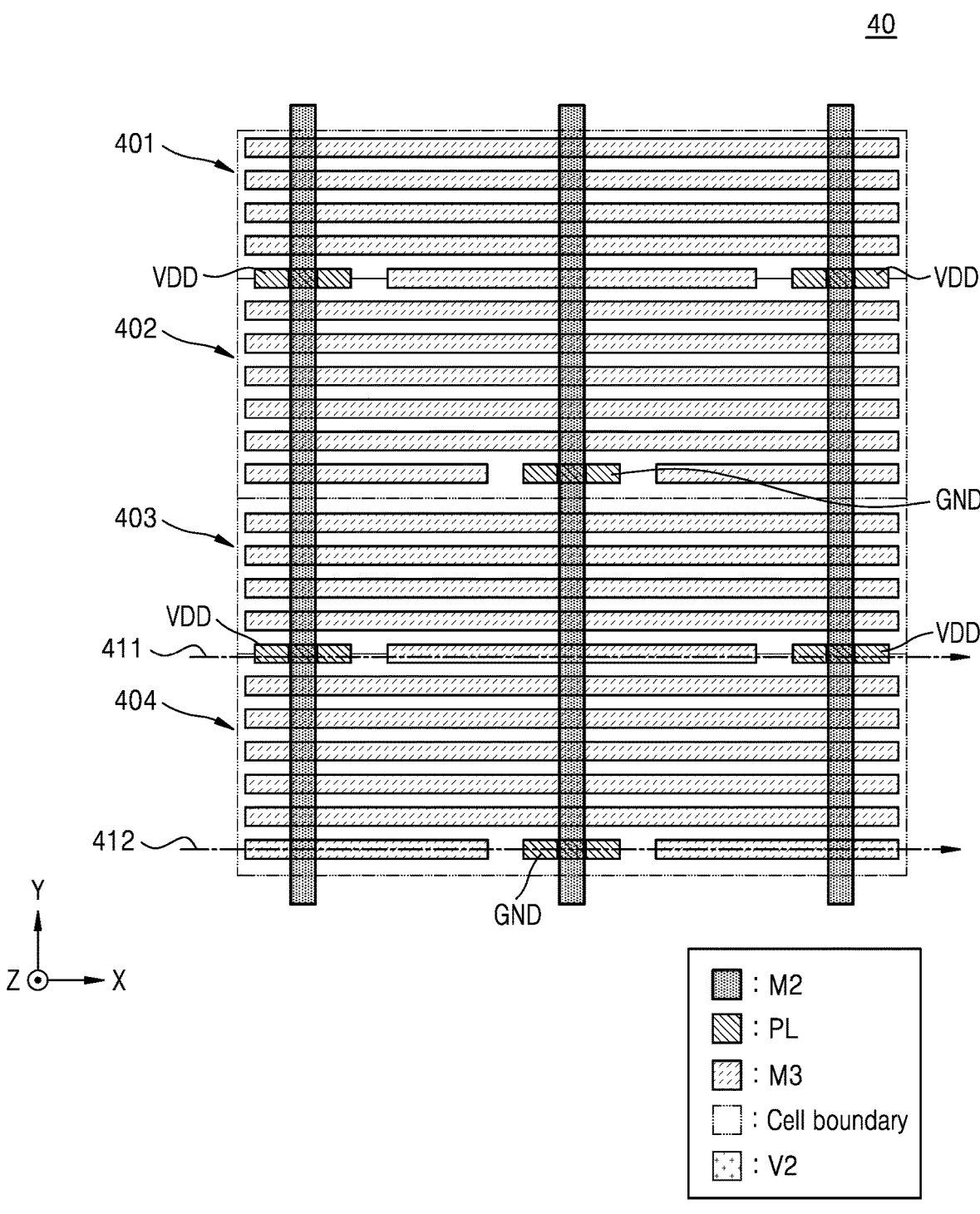
FIGS. 4A, 4B, and 4C are diagrams illustrating a layout of an integrated circuit according to an example embodiment of the inventive concept.
Figure 4B:
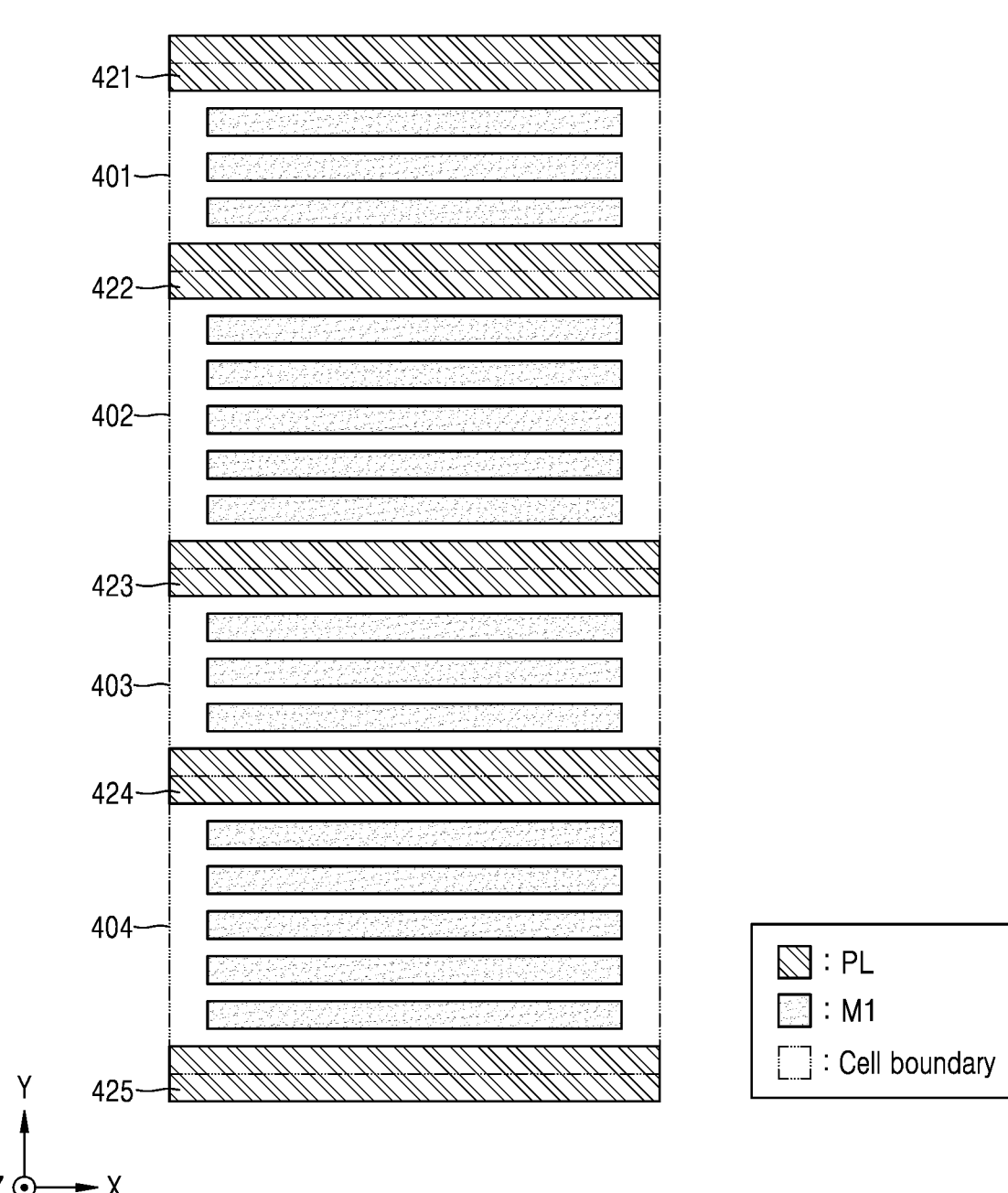
Figure 4C:
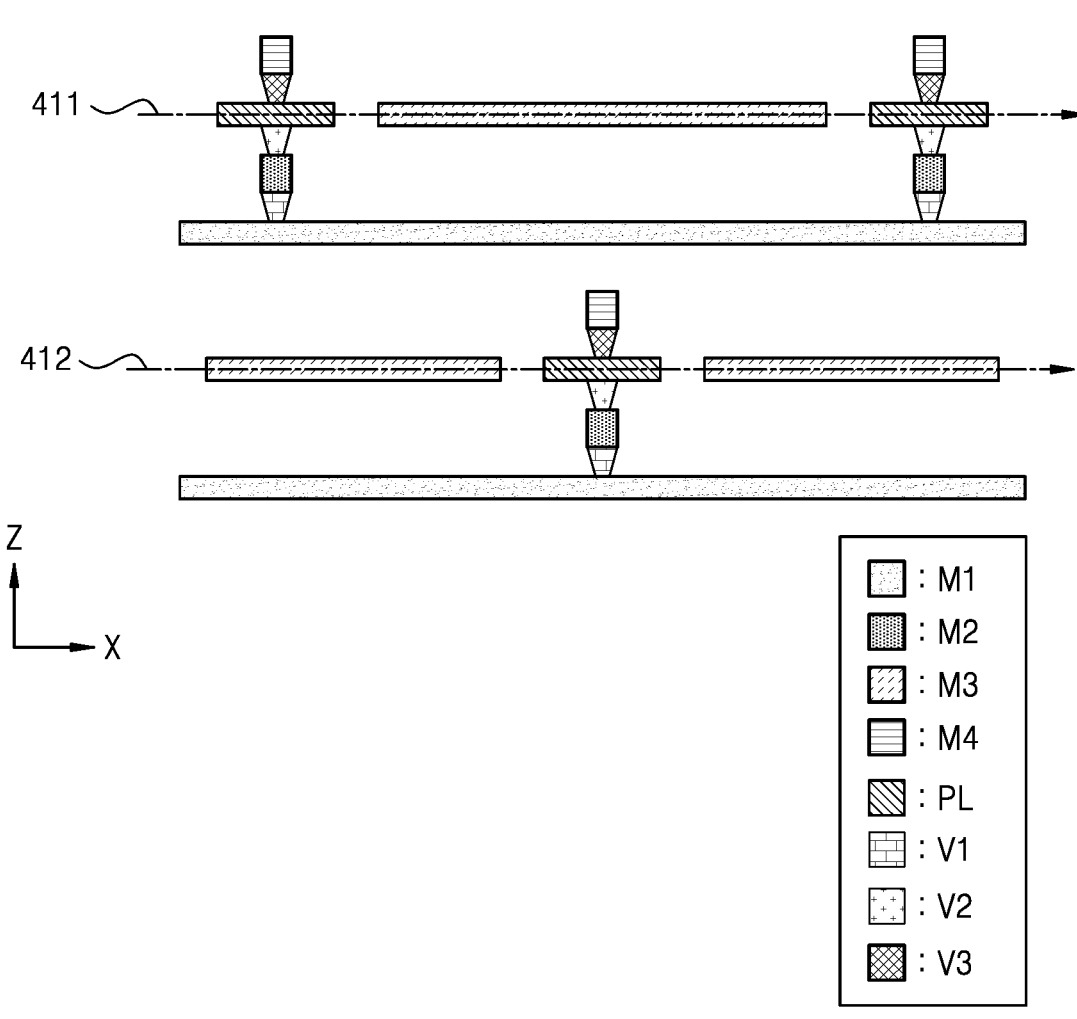

FIGS. 4A to 4C are diagrams illustrating a layout of an integrated circuit according to an example embodiment of the inventive concept.

Referring to FIG. 4A, an integrated circuit 40 according to an example embodiment of the inventive concept may include a plurality of standard cells 401 to 404. The standard cells 401 to 404 may include patterns extending from or in the second metal layer M2 and patterns extending from or in the third metal layer M3. In addition, the integrated circuit 40 may include a plurality of power segments and a plurality of signal segments. A power voltage VDD or a ground voltage GND may be applied to each of the plurality of power segments.

The standard cells 401 to 404 may have various cell heights. For example, the standard cells 401 and 403 may have a cell height of a first height, and the standard cells 402 and 404 may have a cell height of a second height. In addition, the integrated circuit 40 may include standard cells of two different cell heights having a certain ratio such as 9:13 (117:169). However, a cell height is not limited thereto, and may vary.

Standard cells in the integrated circuit 40 may be arranged according to a certain rule. For example, as illustrated in FIG. 4A, when there are two heights, i.e., the first height and the second height, of standard cells included in the integrated circuit 40, the standard cells 401 and 403 having a cell height of the first height and the standard cells 402 and 404 a having cell height of the second height may be alternately arranged with each other. In addition, although not illustrated in FIG. 4A, in the integrated circuit 40, after two standard cells having a cell height of the first height are sequentially arranged in the Y-axis direction, two standard cells having a cell height of the second height may be sequentially arranged adjacent thereto in the Y-axis direction. In addition, in the integrated circuit 40, standard cells having different cell heights may be arranged with a certain ratio. For example, in the integrated circuit 40, standard cells having a cell height of the first height and standard cells having a cell height of the second height may be sequentially arranged in the Y-axis direction with a ratio such as 2:2 or 1:3. However, the arrangement of standard cells is not limited thereto.

Referring to FIG. 4B, the integrated circuit 40 according to an example embodiment of the inventive concept may include patterns extending from or in the first metal layer M1. The number of tracks of the first metal layer M1 formed inside a respective region where each of the standard cells 401 to 404 is arranged (i.e., within respective boundaries of the cells 401 to 404) may vary according to a cell height of each of the standard cells 401 to 404.

A direction in which patterns extend in the first metal layer M1 may be the same as a direction in which patterns extend in the third metal layer M3, and may be perpendicular to a direction in which patterns extend in the second metal layer M2. For example, the patterns in the first metal layer M1 and the third metal layer M3 may extend in the X-axis direction, and the patterns in the second metal layer M2 may extend in the Y-axis direction.

Power lines 421 to 425 in the first metal layer M1 may be connected to a power line and/or a power segment included in the third metal layer M3.

One or more of the power lines 421 to 425 in the first metal layer M1 may not be aligned with a power line and/or a power segment in the third metal layer M3 in a direction in which the metal layers are stacked (e.g., Z-axis direction). That is, in plan view, a subset of the power lines 412 to 425 of the first metal layer M1 may not overlap a power line and/or power segment of the third metal layer M3, or vice versa.

FIG. 4C is a cross-sectional view of the integrated circuit 40 illustrated in plan view in FIG. 4A, taken along axes 411 and 412.

Referring to FIG. 4C, patterns of a plurality of metal layers of the integrated circuit 40 according to the inventive concept may be electrically connected to each other by vias V1, V2, and V3. Also, although not illustrated in FIG. 4A, the integrated circuit 40 may include a plurality of metal layers. Referring to FIG. 4C as an example, the standard cell 404 may include patterns formed in the first metal layer M1 to a fourth metal layer M4.

The via V1 may electrically connect patterns arranged in the first metal layer M1 to patterns arranged in the second metal layer M2, the via V2 may electrically connect patterns arranged in the second metal layer M2 to patterns arranged in the third metal layer M3, and the via V3 may electrically connect patterns arranged in the third metal layer M3 to patterns arranged in the fourth metal layer M4. A power segment or a power line may provide power to an underlying standard cell through the vias V1 to V3.

Figure 5A:
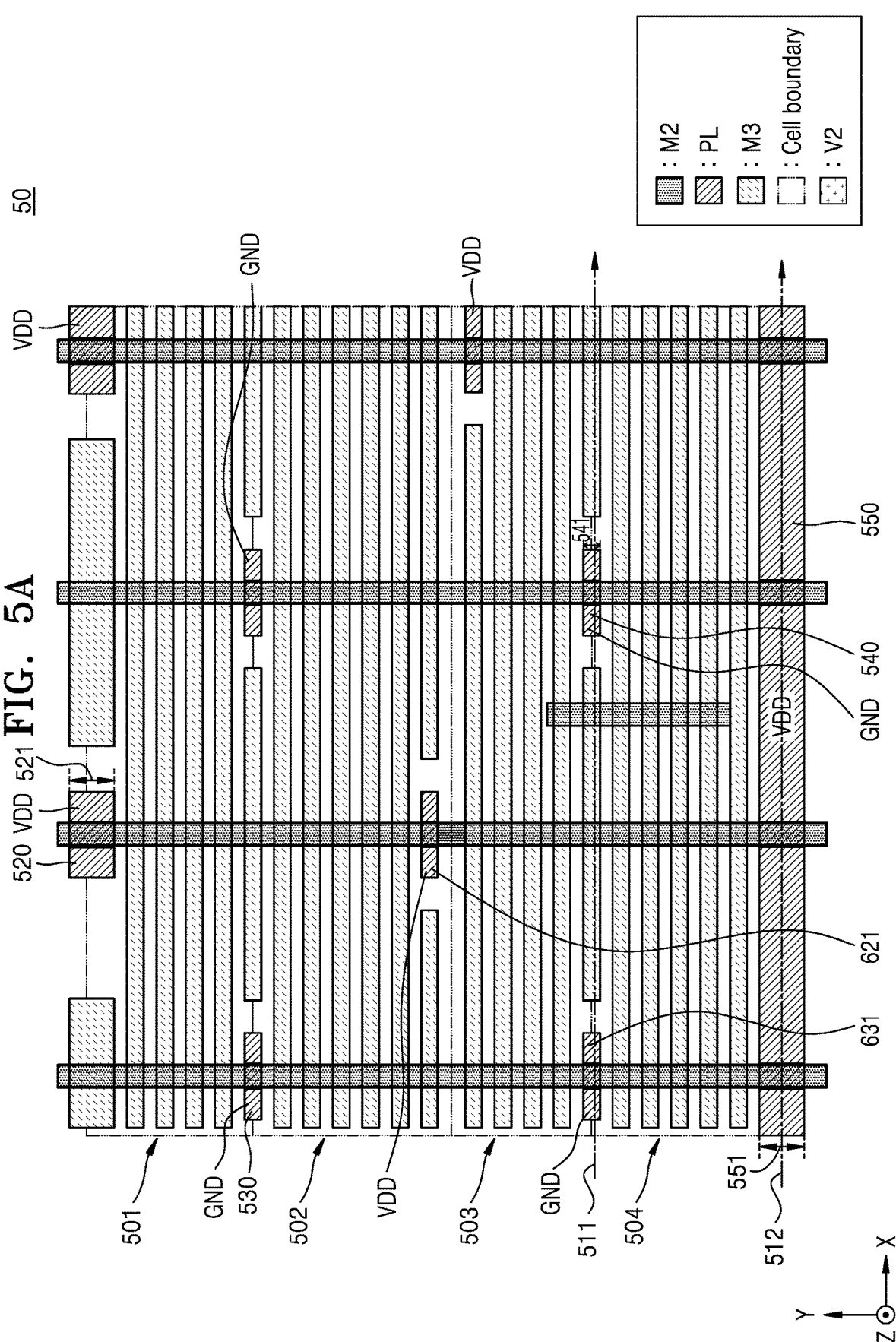
FIGS. 5A and 5B are diagrams illustrating a layout of an integrated circuit according to an example embodiment of the inventive concept.
Figure 5B:
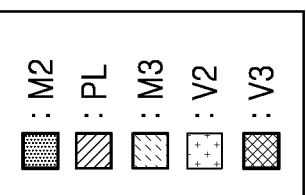
Figure 5B:
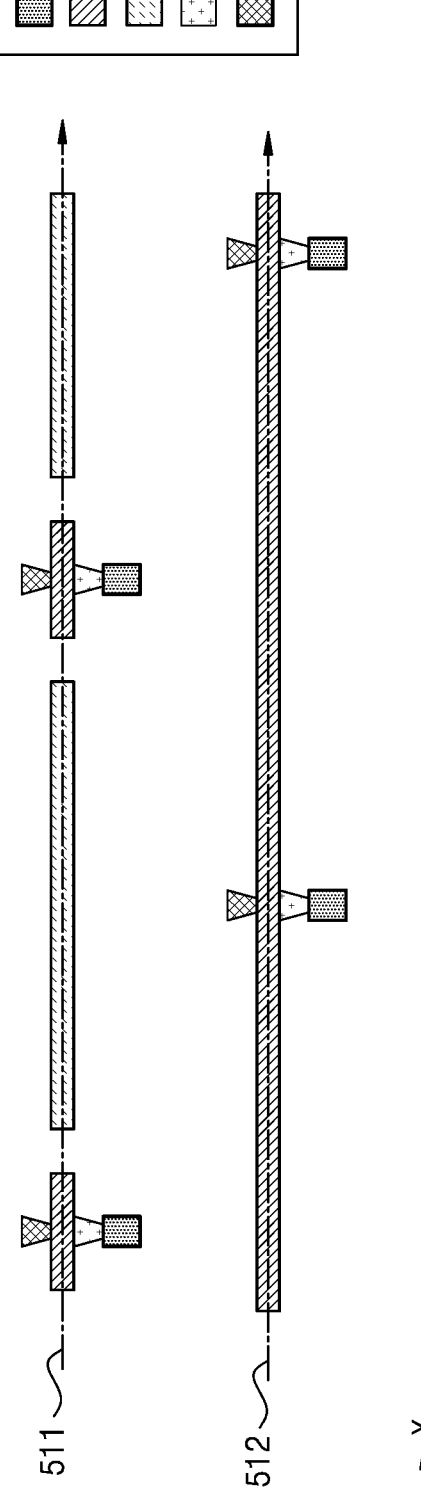

FIGS. 5A and 5B are diagrams illustrating a layout of an integrated circuit according to an example embodiment of the inventive concept.

FIG. 5B is a cross-sectional view of the integrated circuit 50 illustrated in plan view in FIG. 5A, taken along cross-sections 511 and 512. Referring to FIGS. 5A and 5B, the integrated circuit 50 according to an example embodiment of the inventive concept may include a plurality of standard cells 501 to 504. The integrated circuit 50 may include patterns extending from the second metal layer M2 and patterns extending from the third metal layer M3. In addition, the integrated circuit 50 may include a plurality of power segments and a plurality of signal segments. A power voltage VDD or a ground voltage GND may be applied to each of the plurality of power segments.

For example, the standard cells 502 and 503 may have a cell height of a first height, and the standard cells 501 and 504 may have a cell height of a second height. For example, the first height may be less than the second height.

An area of the standard cells 501 and 504 having a relatively large cell height may be larger than that of the standard cells 502 and 503, and thus, the number of patterns formed in the standard cells 501 and 504 may be greater than the number of patterns formed in the standard cells 502 and 503. An amount of power required by the standard cells 501 and 504 having a relatively large cell height may be greater than an amount of power required by the standard cells 502 and 503 having a relatively small cell height. As the standard cell 504 requires a large amount of power, the standard cell 504 may not be supplied with sufficient power by receiving power from a power segment. Accordingly, a power line 550 may be formed on the standard cell 504, and the standard cell 504 may receive power from the power line 550. In addition, a pitch 551 of the power line 550 may be greater than a pitch (e.g., 541) of power segments (e.g., 540) included in the standard cells 502 and 503 having a relatively small cell height.

In addition, the standard cell 501 may not require as much power as the standard cell 504, and thus, a power segment 520 may be arranged on the standard cell 501, and the standard cell 501 may receive power from the power segment 520. In addition, a size of a pitch 521 (e.g., a width in the Y-direction) of the power segment 520 may be proportional to an amount of power required by the standard cell 501, and thus, the pitch 521 of the power segment 520 may be greater than a pitch of power segments included in the standard cells 502 and 503, which may require a relatively small amount of power.

Patterns of a plurality of metal layers of the integrated circuit 50 may be electrically connected to each other by the vias V2 and V3.

Figure 6A:
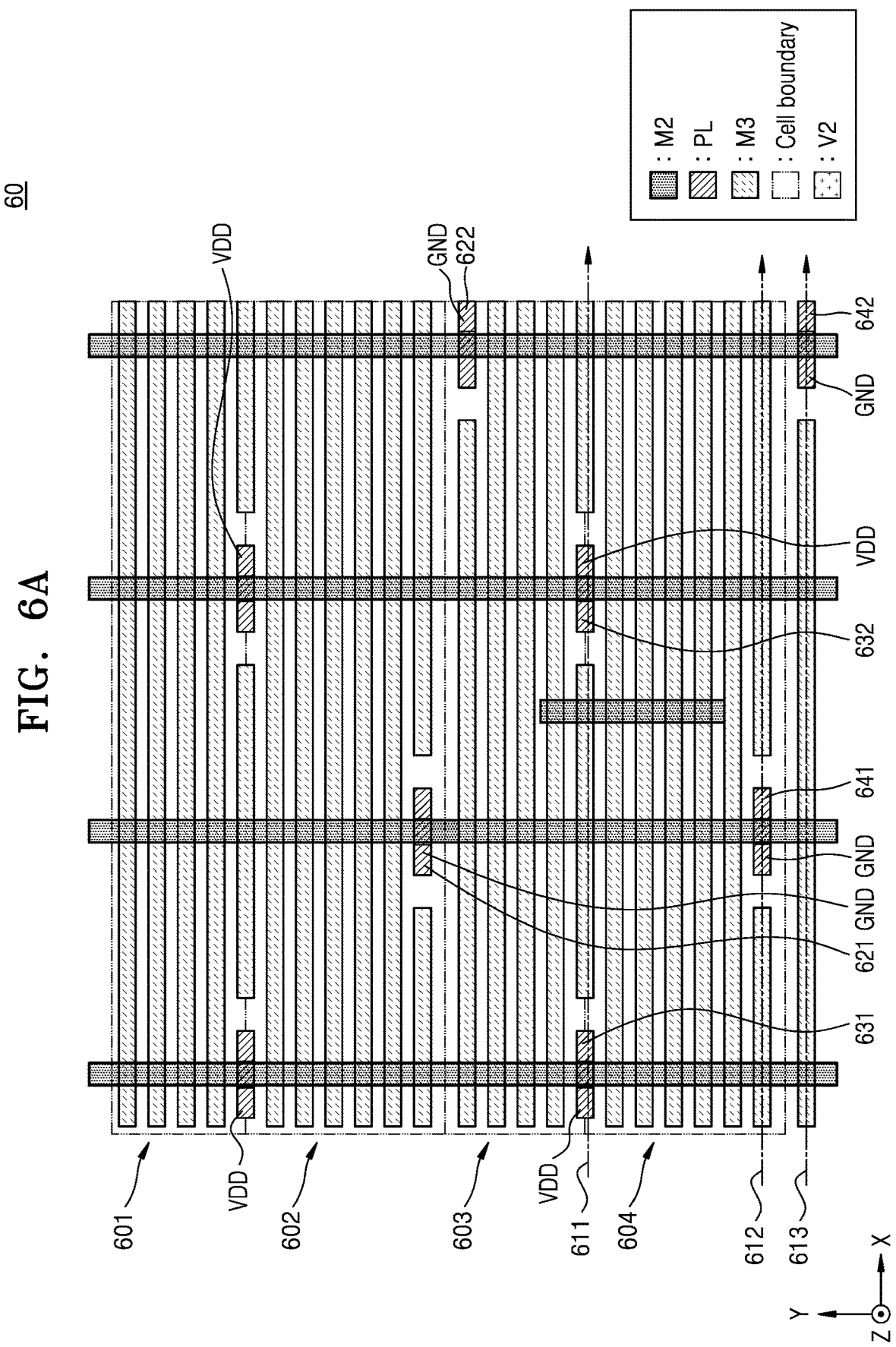
Figure 6B:
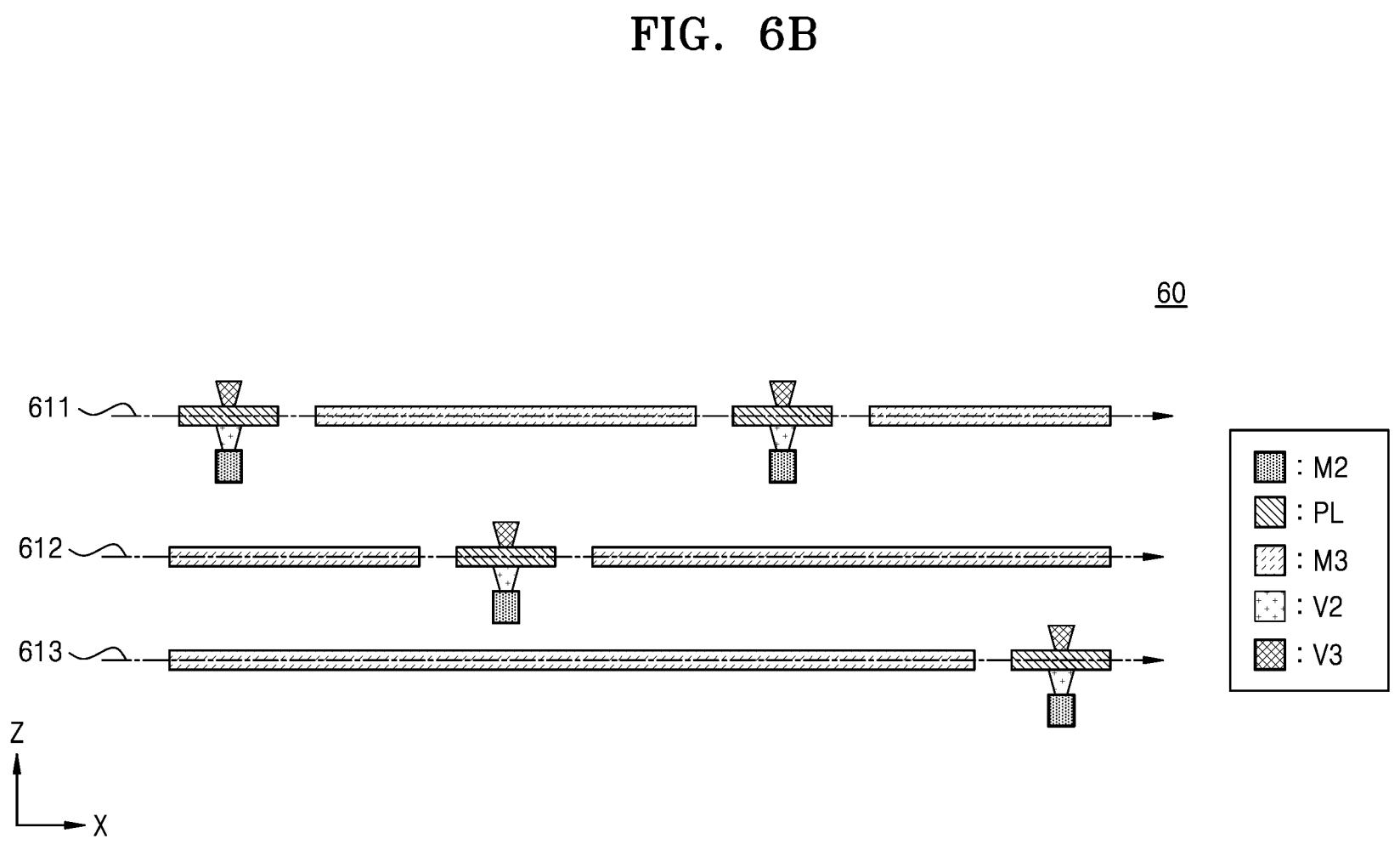

FIGS. 6A and 6B are diagrams illustrating a layout of an integrated circuit according to an example embodiment of the inventive concept.

FIG. 6B is a cross-sectional view of an integrated circuit 60 illustrated in plan view in FIG. 6A, taken along cross-sections 611, 612, and 613. Referring to FIG. 6A, the integrated circuit 60 according to an example embodiment of the inventive concept may include a plurality of standard cells 601 to 604. Patterns extending from the second metal layer M2 and patterns extending from the third metal layer M3 may be included in the a region where the plurality of standard cells 601 to 604 are arranged. In addition, the integrated circuit 60 may include a plurality of power segments and a plurality of signal segments. A power voltage VDD or a ground voltage GND may be applied to each of the plurality of power segments.

The power segment may be included in the region where the plurality of standard cells 601 to 604 are arranged. The power segment may be located at or along a standard cell boundary, or may be located inside a standard cell (e.g., within a boundary of the standard cell). For example, power segments 621 and 622 are located inside a region where a standard cells is arranged, and power segments 631, 632, 641, and 642 are located at or along a standard cell boundary.

As in the case of the power segments 621 and 622, when power segments are respectively included in regions where different standard cells are arranged with reference to a standard cell boundary, rather than being located at or along the standard cell boundary, the power segments, i.e., the power segments 621 and 622 may be respectively electrically connected to different patterns of the second metal layer M2. In other words, a region where the standard cell 602 is arranged may include the power segment 621 arranged adjacent to a cell boundary with respect to the standard cell 603, a region where the standard cell 603 is arranged may include the power segment 622 arranged adjacent to the cell boundary, and the power segment 621 and the power segment 622 may be respectively electrically connected to different patterns formed in the second metal layer M2.

In addition, when a power segment is located at a standard cell boundary, the power segment may be arranged adjacent to another power segment electrically connected to a same pattern in the second metal layer M2.

Patterns of a plurality of metal layers of the integrated circuit 60 according to an example embodiment of the inventive concept may be electrically connected to each other by the vias V2 and V3, and a power segment may provide power to standard cells through the vias V2 and V3.

Figure 7A:
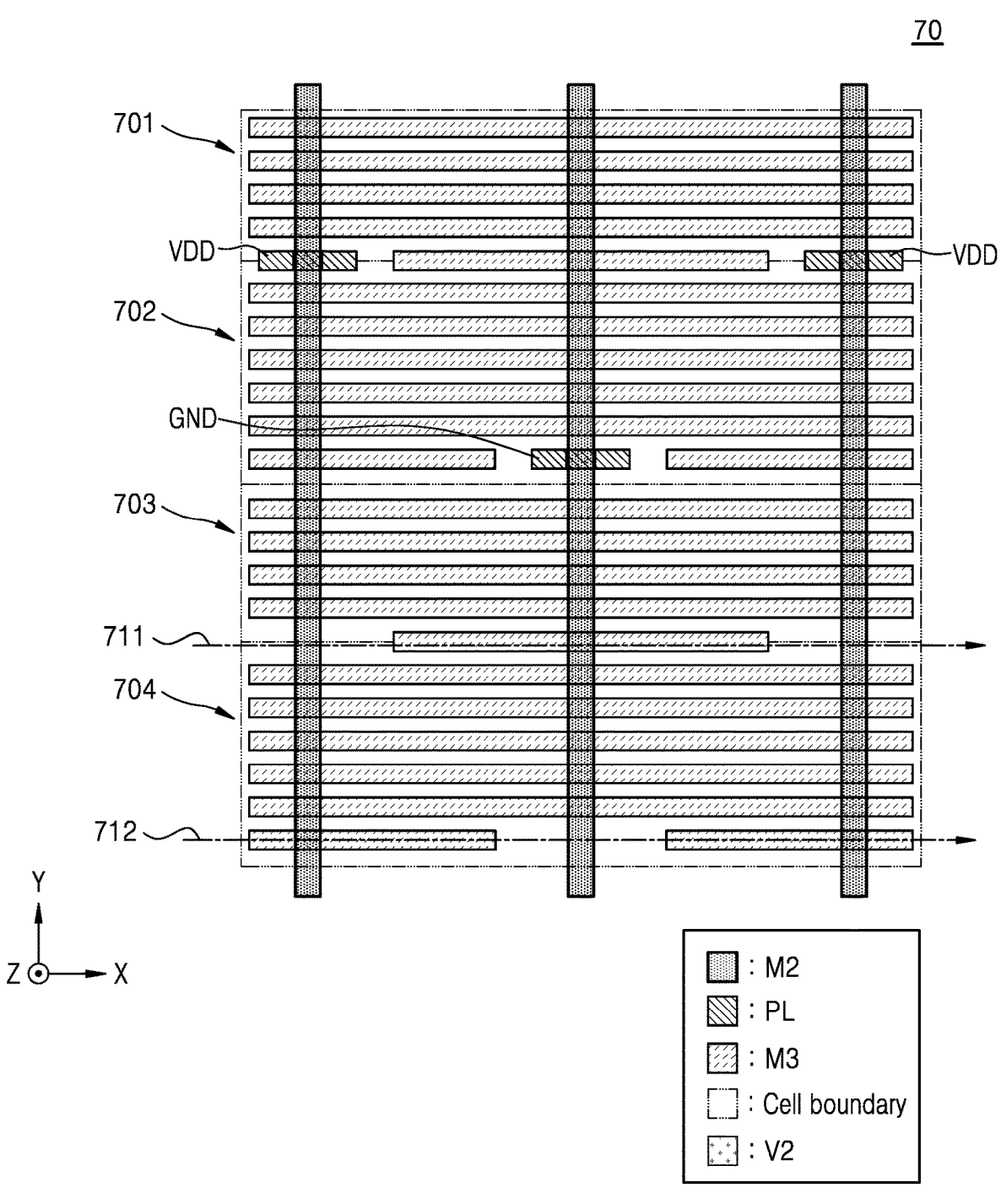
FIGS. 7A and 7B are diagrams illustrating a layout of an integrated circuit according to an example embodiment of the inventive concept.
Figure 7B:
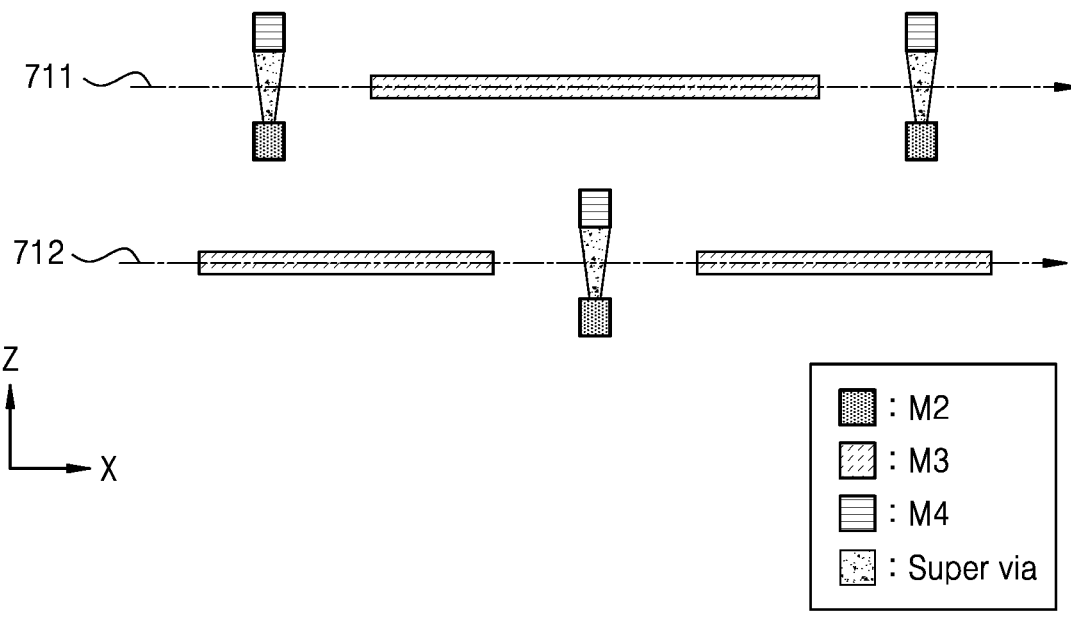

FIGS. 7A and 7B are diagrams illustrating a layout of an integrated circuit according to an example embodiment of the inventive concept. In particular, FIG. 7B is a cross-sectional view of an integrated circuit 70 illustrated in plan view in FIG. 7A, taken along cross-sections 711 and 712.

Referring to FIG. 7A, an integrated circuit 70 according to an example embodiment of the inventive concept may include a plurality of standard cells 701 to 704. The standard cells 701 to 704 may include patterns extending from the second metal layer M2 and patterns extending from the third metal layer M3. In addition, the integrated circuit 70 may include a plurality of power segments and a plurality of signal segments. A power voltage VDD or a ground voltage GND may be applied to each of the plurality of power segments.

When a power segment is not required, as in the case of the standard cells 703 and 704, the integrated circuit 70 may not include a power segment.

Referring to FIG. 7B, patterns of a plurality of metal layers of the integrated circuit 70 according to an example embodiment of the inventive concept may be electrically connected to each other by super vias.

The super via may be a via capable of electrically connecting patterns included in non-adjacent or non-consecutively stacked metal layers to each other. For example, the super via may be a via capable of electrically connecting patterns included in the second metal layer M2 to patterns included in the fourth metal layer M4, but is not limited thereto.

FIGS. 8A to 8D are diagrams illustrating a layout of an integrated circuit according to an example embodiment of the inventive concept.

Figure 8A:
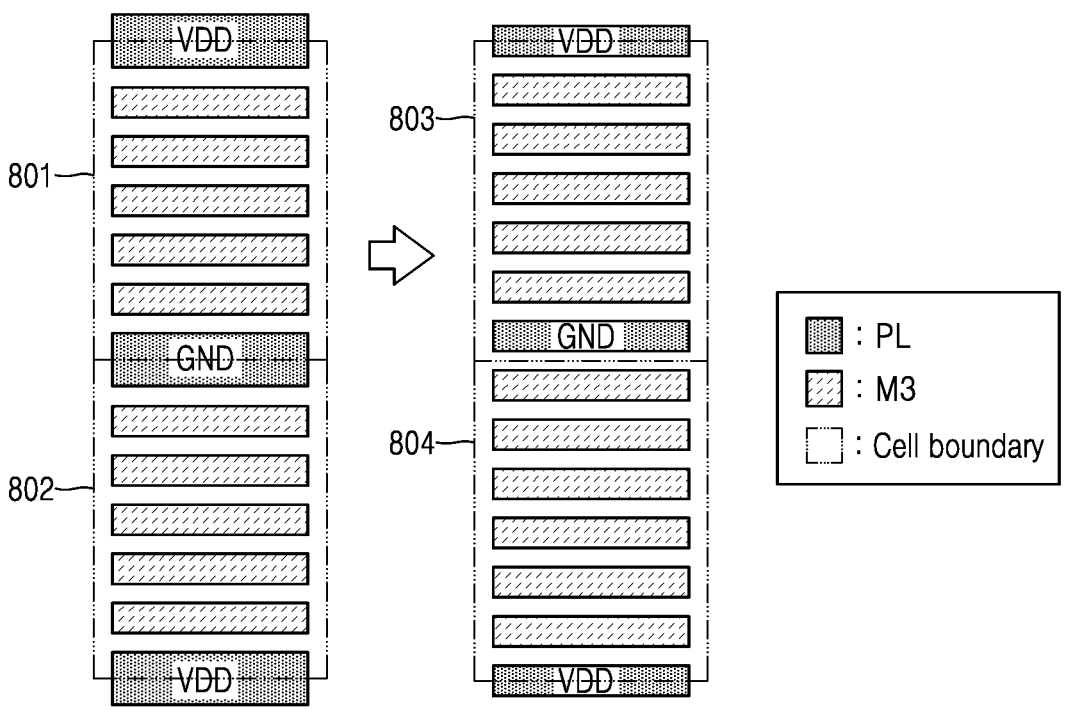

Referring to FIG. 8A, an integrated circuit 80 according to an example embodiment of the inventive concept may include a plurality of standard cells 801 to 804, and may include patterns extending in the third metal layer M3. In addition, the integrated circuit 80 may include a plurality of power segments and a plurality of signal segments. A power voltage VDD or a ground voltage GND may be applied to each of the plurality of power segments.

The integrated circuit 80 may be configured such that power lines are arranged at a cell boundary between the standard cells 801 and 802. In contrast, the integrated circuit 80 may include power lines arranged inside regions where the standard cells 803 and 804 are respectively arranged, rather than at a cell boundary between the standard cells 803 and 804, and the standard cell 804 may secure more additional space for routing than the standard cell 802.

Figure 8B:
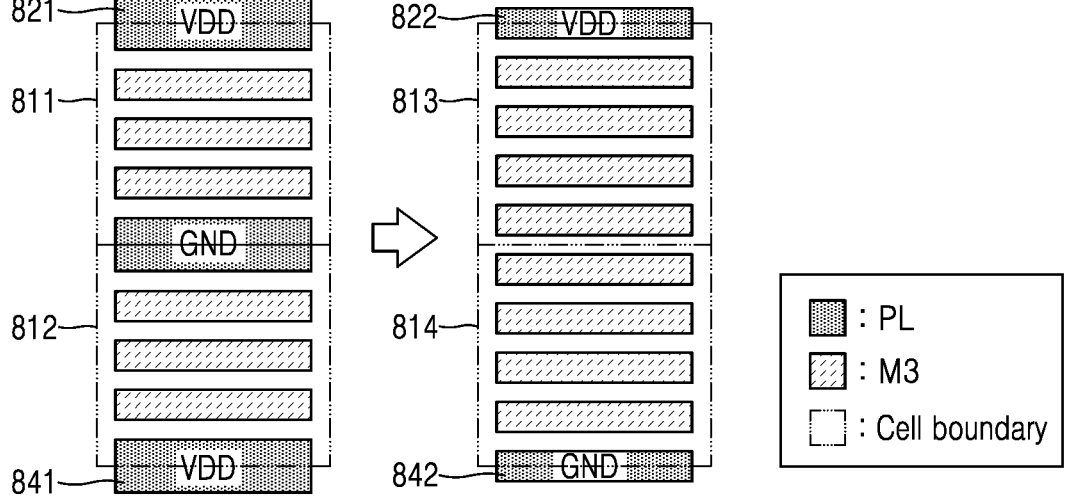

Referring to FIG. 8B, the integrated circuit 80 may be configured such that power lines are located at each cell boundary, as in the case of standard cells 811 and 812. In contrast, in standard cells 813 and 814, a pitch of power lines may be reduced, and a portion of the power lines may be removed or omitted such that space may be secured in the standard cells 813 and 814, and thus, the standard cells 813 and 814 may include more signal lines than the standard cells 811 and 812.

Figure 8C:
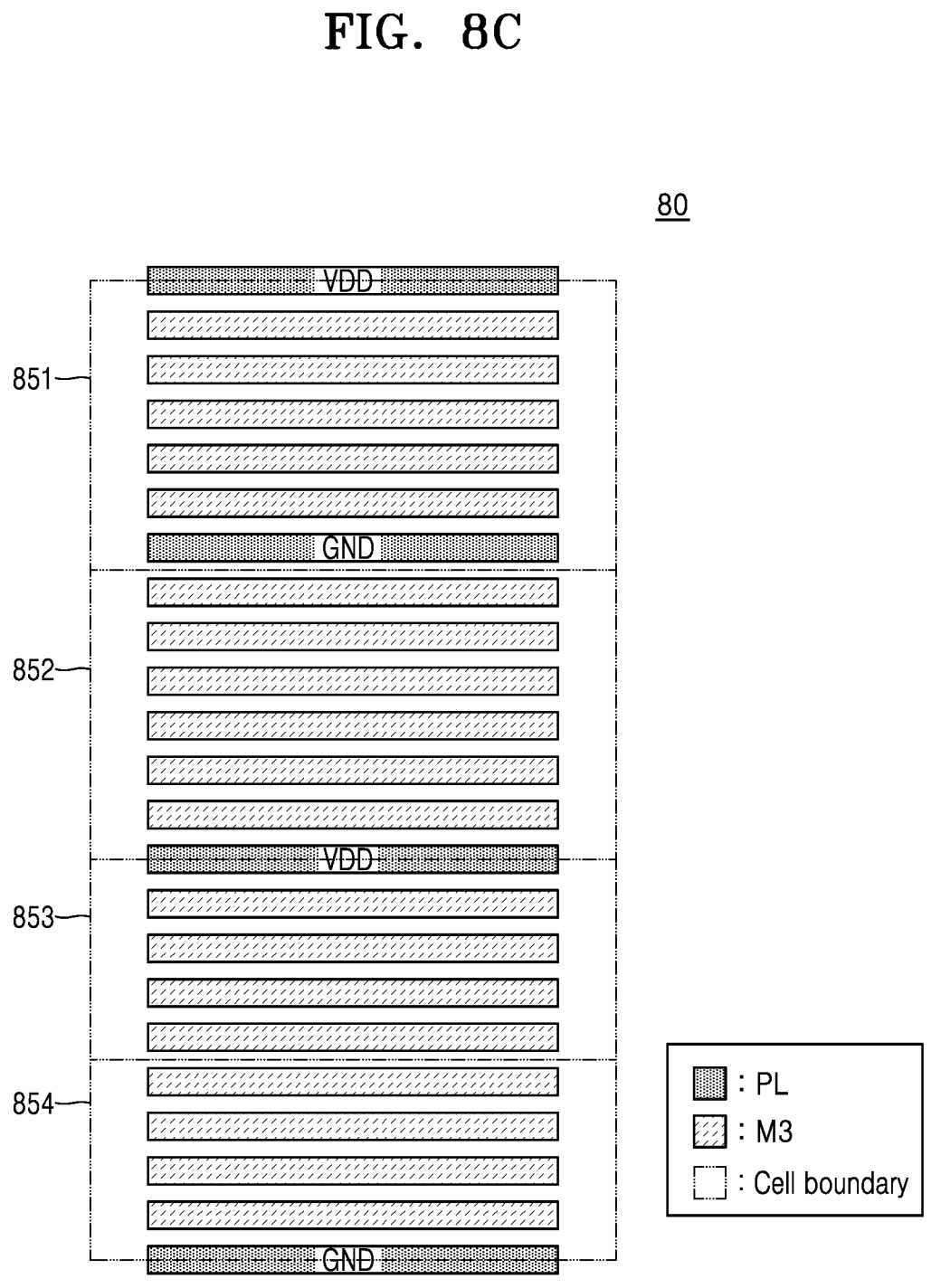
Figure 8D:
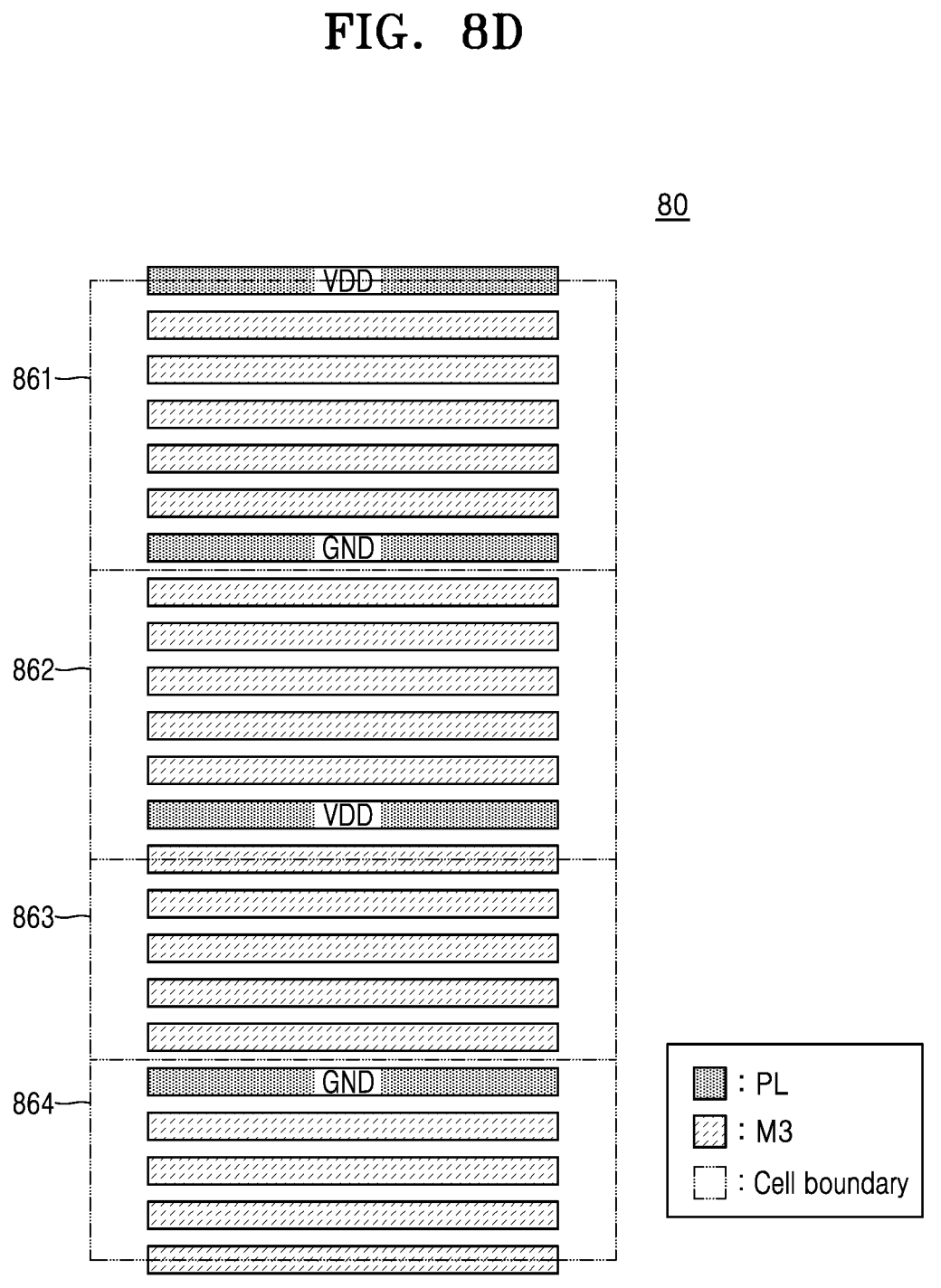

Referring to FIGS. 8C and 8D, standard cells 851 to 854 and 861 to 864 may be arranged in various ways depending on a cell height thereof.

For example, the arrangement of standard cells may vary based on an amount of power required by the standard cells. Standard cells having a large cell height may require a greater amount of power, and thus, more power lines may be included in the standard cells having a large cell height.

Figure 9A:
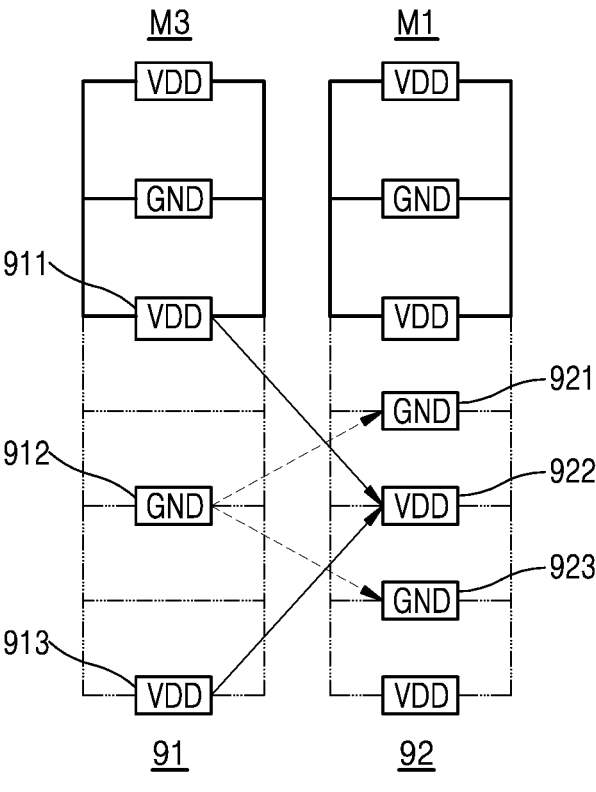
FIGS. 9A and 9B are diagrams illustrating a layout of an integrated circuit according to an example embodiment of the inventive concept.
Figure 9B:
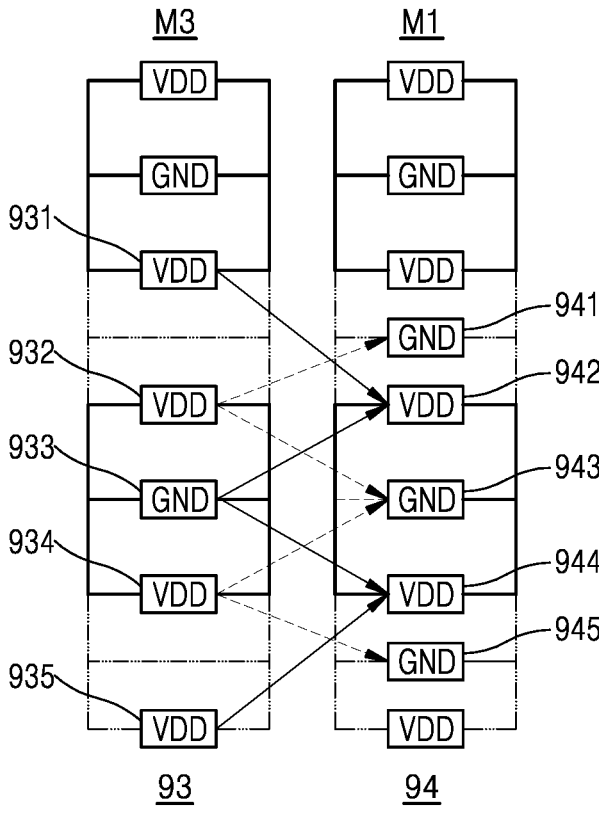

FIGS. 9A and 9B are diagrams illustrating a layout of an integrated circuit according to an example embodiment of the inventive concept.

Referring to FIG. 9A, the integrated circuit according to an example embodiment of the inventive concept may include a plurality of standard cells, and the plurality of standard cells may receive power through power lines of the first metal layer M1 and power lines or power segments of the third metal layer M3.

A portion or subset of the power lines 92 of the first metal layer M1 may not be aligned with the power lines/power segments 91 of the third metal layer M3, e.g., in the vertical (Z-) direction. For example, the power lines/power segments of the third metal layer M3 may not be arranged over (i.e., may not overlap) power lines 921 and 923 of the first metal layer M1 in plan view, that is, the power lines 921 and 923 of the first metal layer M1 may not be aligned with the power lines/power segments of the third metal layer M3 in the vertical direction.

Accordingly, a power line 912 of the third metal layer M3 may be electrically connected to the power lines 921 and 923 of the first metal layer M1 that are not aligned with the power line 912, and power lines 911 and 913 of the third metal layer M3 may be electrically connected to a power line 922 of the first metal layer M1 that is not aligned with the power lines 911 and 913.

Referring to FIG. 9B, a portion or subset of power lines 94 of the first metal layer M1 may not be aligned with power lines/power segments 93 of the third metal layer M3, e.g., in the vertical (Z-) direction. Power lines 931 and 933 of the third metal layer M3 may be electrically connected to a power line 942 of the first metal layer M1 that is not aligned with the power lines 931 and 933, power lines 933 and 935 of the third metal layer M3 may be electrically connected to a power line 944 of the first metal layer M1 that is not aligned with the power lines 933 and 935, a power line 932 of the third metal layer M3 may be electrically connected to power lines 941 and 943 of the first metal layer M1 that are not aligned with the power line 932, and a power line 934 of the third metal layer M3 may be electrically connected to power lines 943 and 945 of the first metal layer M1 that are not aligned with the power line 934, but the power lines are not limited to these examples.

Figure 10:
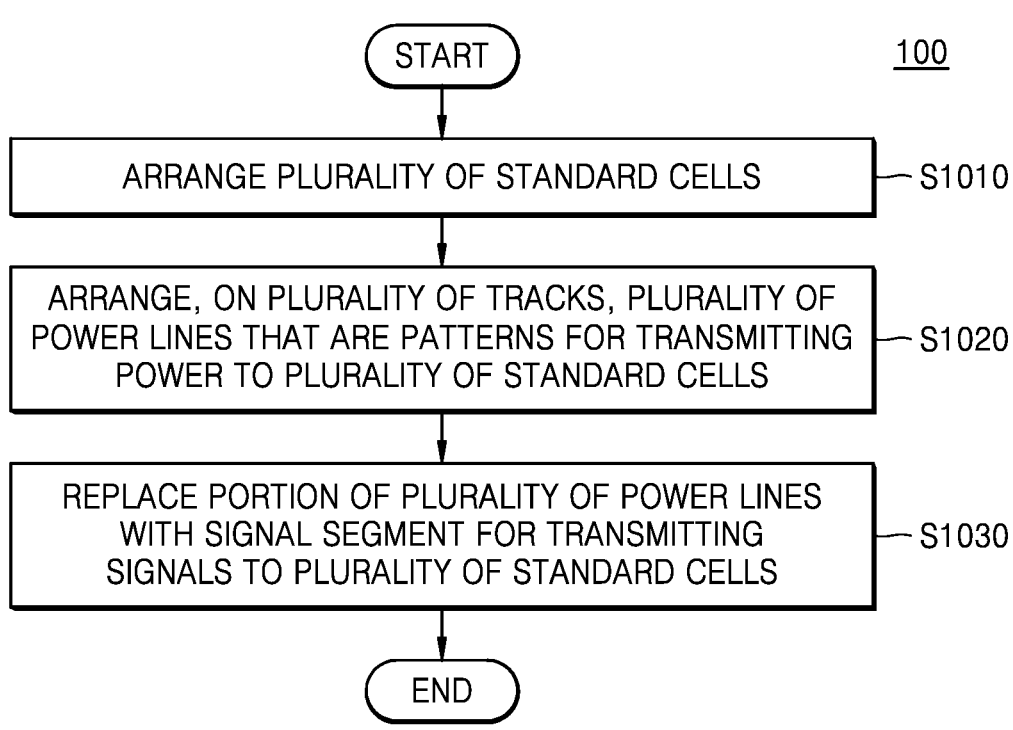
FIG. 10 is a flowchart illustrating a method of designing an integrated circuit, according to an example embodiment of the inventive concept.

FIG. 10 is a flowchart illustrating a method of designing an integrated circuit, according to an example embodiment of the inventive concept.

Referring to FIG. 10, in operation S1010, the method of designing an integrated circuit according to an example embodiment of the inventive concept may include arranging a plurality of standard cells.

In operation S1020, the method of designing an integrated circuit according to an example embodiment of the inventive concept may include arranging, on a plurality of tracks, a plurality of power lines that are patterns for transmitting power to the plurality of standard cells.

In operation S1030, the method of designing an integrated circuit according to an example embodiment of the inventive concept may include replacing a portion of one or more of the plurality of power lines with a respective signal segment that transmits signals to the plurality of standard cells. The portion to be replaced with the signal segment may be determined based on an amount of power required by a cell in which the power line to be replaced is arranged. For example, when the amount of power required by the cell is small, the entire power line may not be required. Accordingly, it may be determined that a portion of the power line is replaced with the signal segment.

In addition, the method of designing an integrated circuit may further include replacing a dummy signal segment, which is a portion of one or more of the arranged signal lines that is not used for signal transmission, with a power segment, which is a pattern for transmitting power to the plurality of standard cells and is formed in a portion of a track, and arranging the power segment. By replacing the dummy signal segment which may be unnecessary with the power segment, a space in a region where a standard cell is arranged may be efficiently used.

In addition, the method of designing an integrated circuit may include arranging the power segment to be in contact with a power line arranged adjacent to the dummy signal segment. In detail, when there are a power segment and a power line arranged adjacent to a dummy signal segment, a pattern of the power segment may be extended to be in contact with the power line. Accordingly, metal resources included in the integrated circuit may be efficiently used. In addition, the power segment may be arranged on the dummy signal segment by extending a metal of a previously arranged power line.

In addition, the method of designing an integrated circuit may include, when power segments on different tracks are arranged adjacent to each other, merging the adjacent power segments into one power segment.

In addition, the method of designing an integrated circuit may include arranging a power segment inside the plurality of standard cells.

In addition, the method of designing an integrated circuit may include removing the dummy signal segment which is a portion of the arranged signal lines that is not used for signal transmission.

In addition, the method of designing an integrated circuit may include forming a via for electrically connecting a lower metal layer of a metal layer on which the dummy signal segment is arranged to an upper metal layer of the metal layer on which the dummy signal is arranged, on the lower metal layer.

Figure 11A:
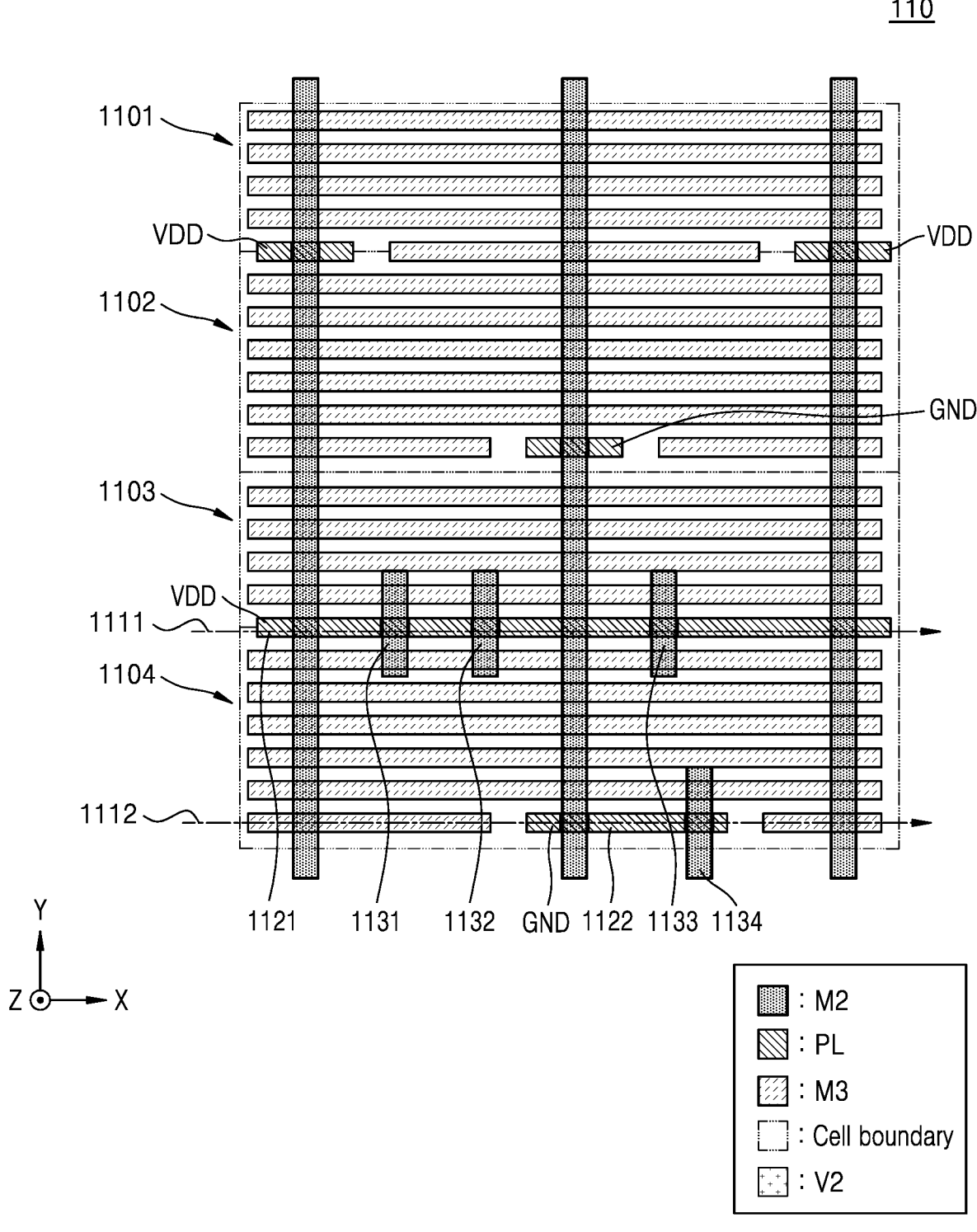
FIGS. 11A and 11B are diagrams illustrating a layout of an integrated circuit according to an example embodiment of the inventive concept.
Figure 11B:
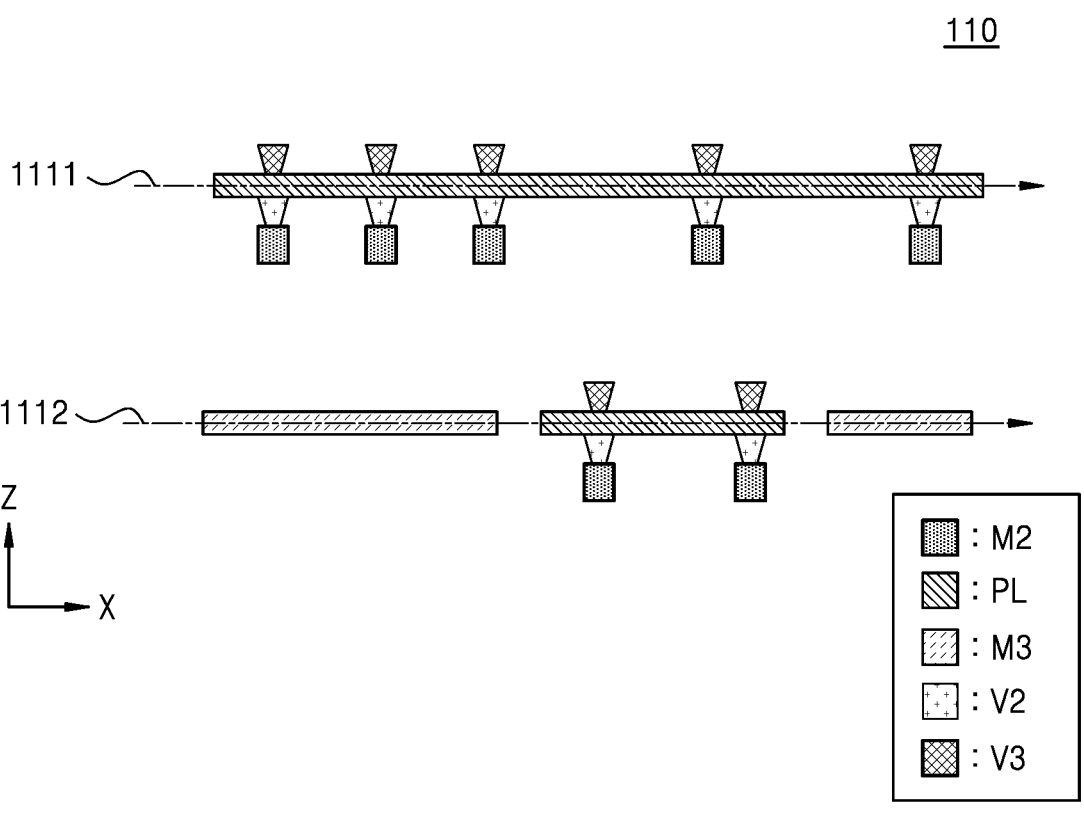

FIGS. 11A and 11B are diagrams illustrating a layout of an integrated circuit according to an example embodiment of the inventive concept.

FIG. 11B is a cross-sectional view of an integrated circuit 110 illustrated in FIG. 11A, taken along cross-sections 1111 and 1112.

Referring to FIG. 11A, the integrated circuit 110 according to an example embodiment of the inventive concept may include a plurality of standard cells 1101 to 1104.

Referring to FIGS. 4A and 11A, in a method of designing the integrated circuit 110 according to an example embodiment of the inventive concept, a dummy signal segment may be determined in the standard cells 401 to 404 of FIG. 4A. For example, a signal segment formed on the axes 411 and 412 of FIG. 4A may be determined as a dummy signal segment. In the method of designing an integrated circuit, because a dummy signal segment may not be necessary in a standard cell, a power segment may be arranged on the dummy signal segment. In detail, by extending a pattern of a power segment in FIG. 4A in the X-axis direction, as in the case of the power segments 1121 and 1122 of FIG. 11A, a power line or an extended power segment may be formed instead of the dummy signal segment.

In addition, as the power segments 1121 and 1122 are formed, patterns 1131, 1132, 1133, and 1134 may be additionally formed in the second metal layer M2. By forming the patterns 1131, 1132, 1133, and 1134, resistance may be reduced, thereby improving IR drop characteristics and electromigration (EM) characteristics.

Patterns of a plurality of metal layers of the integrated circuit 110 according to an example embodiment of the inventive concept may be electrically connected to each other by the vias V2 and V3.

Figure 12A:
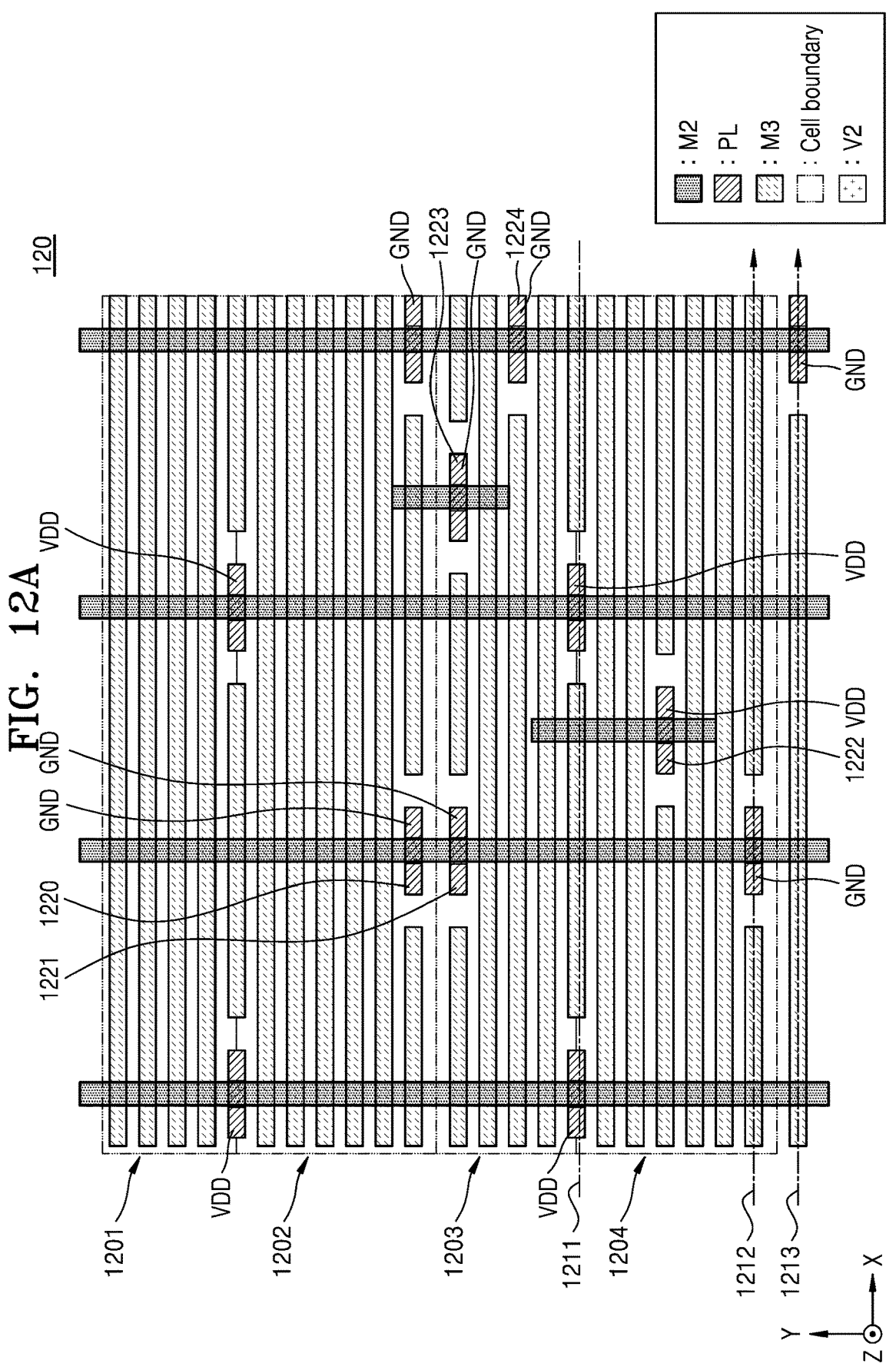
FIGS. 12A, 12B, and 12C are diagrams illustrating a layout of an integrated circuit according to an example embodiment of the inventive concept.
Figure 12B:
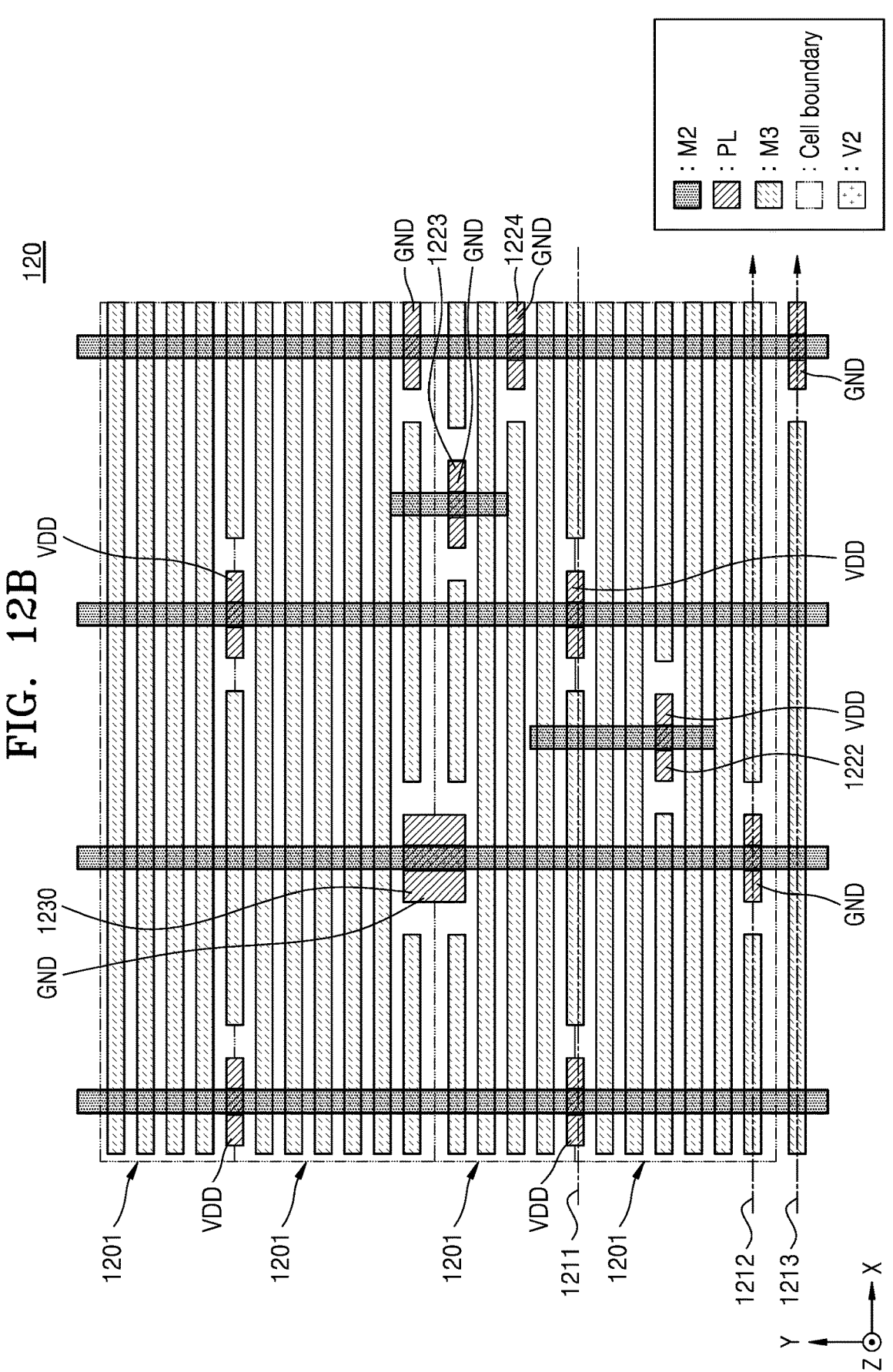
Figure 12C:
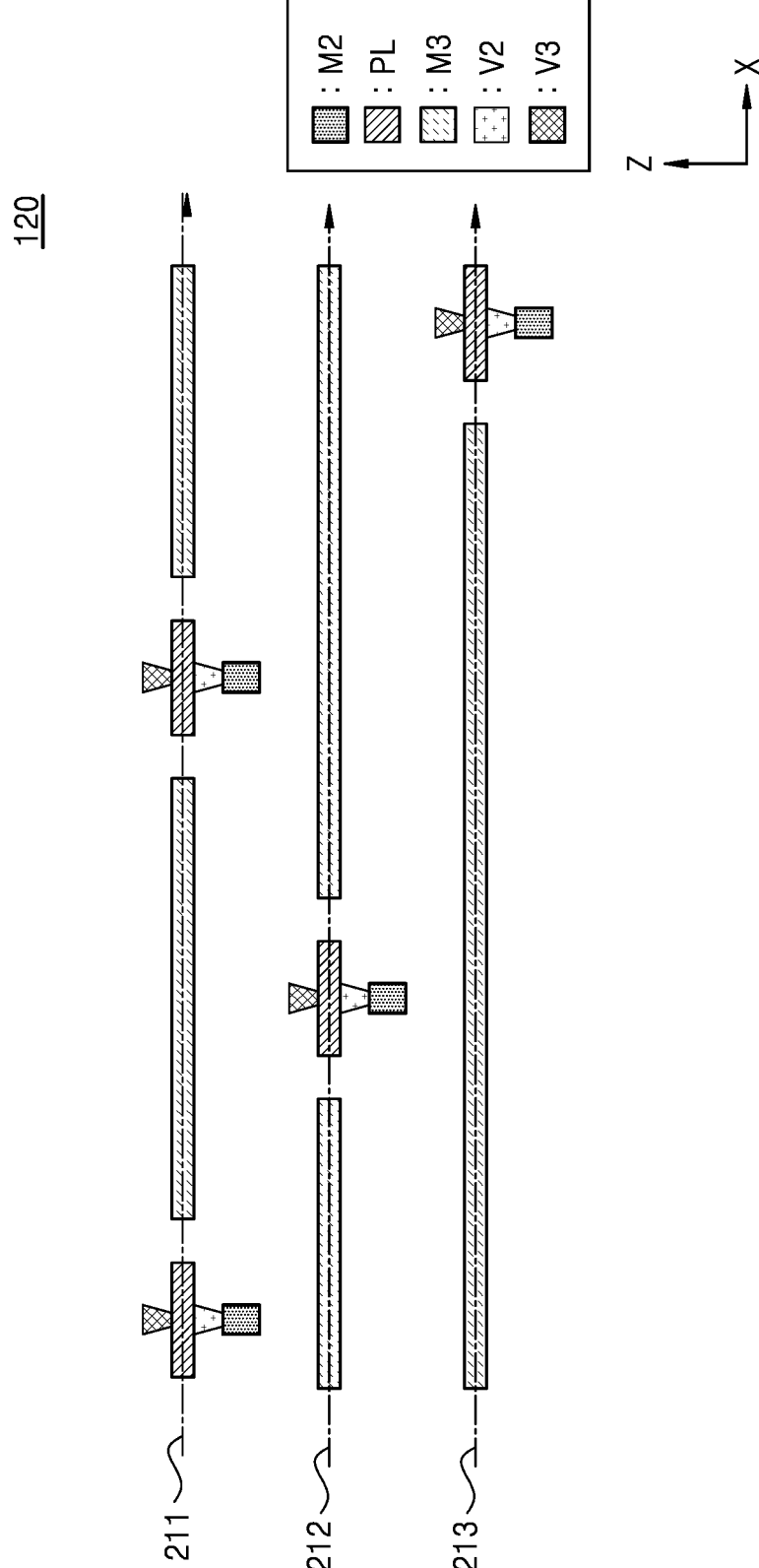

FIGS. 12A to 12C are diagrams illustrating a layout of an integrated circuit according to an example embodiment of the inventive concept. FIG. 12C is a cross-sectional view of an integrated circuit 120 illustrated in FIG. 12A, taken along cross-sections 1211, 1212, and 1213.

Referring to FIG. 12A, the integrated circuit 120 according to an example embodiment of the inventive concept may include a plurality of standard cells 1201 to 1204. The plurality of standard cells 1202, 1203, and 1204 may include a power segment inside the standard cell. Power segments may be arranged adjacent to a cell boundary, as in the case of power segments 1220, 1221, and 1223, and the power segments may be arranged to be contained inside a standard cell without being adjacent to a cell boundary, as in the case of power segments 1222 and 1224. In FIG. 12A, the power segment 1220 is formed on a power-signal track formed close to the standard cell 1202 at a cell boundary, and the power segment 1221 is formed on a power-signal track formed close to the standard cell 1203.

Referring to FIGS. 12A and 12B, in a method of designing the integrated circuit 120 according to an example embodiment of the inventive concept, the power segments 1220 and 1221 of FIG. 12A arranged adjacent to each other with reference to a cell boundary may be merged like a power segment 1230 of FIG. 12B. In this case, the via V2 electrically connecting the power segment 1230 may be formed in a long bar shape such that the power segment 1230 formed on two tracks may be electrically connected to each other by a single via. However, a shape of a via is not limited thereto, and the via may be formed in various shapes such as a square shape. In addition, the via may be formed to electrically connect power segments formed on two or more tracks.

Referring to FIG. 12C, patterns of a plurality of metal layers of the integrated circuit 120 according to an example embodiment of the inventive concept may be electrically connected to each other by the vias V2 and V3.

Figure 13:
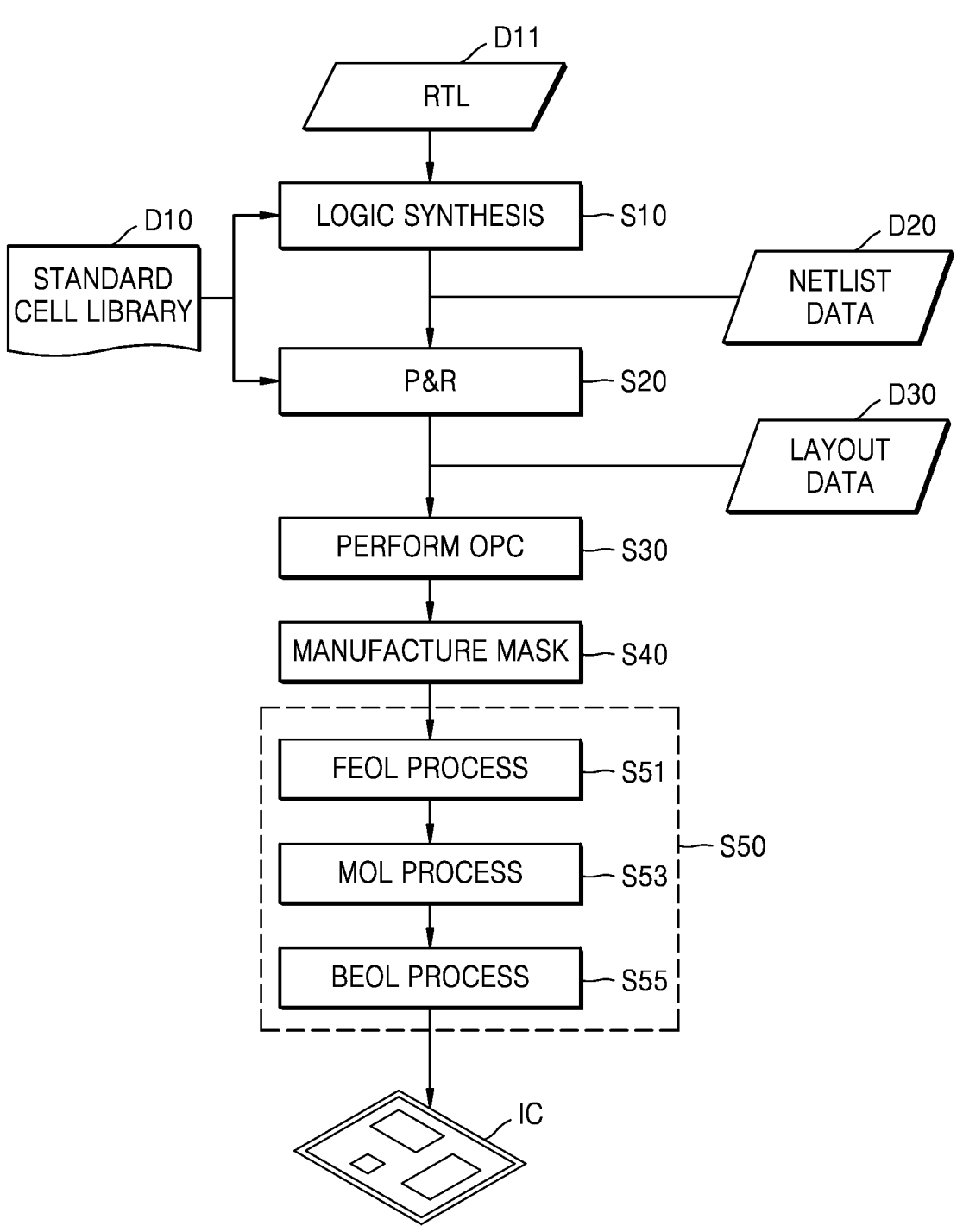
FIG. 13 is a flowchart illustrating a method of fabricating an integrated circuit, according to an example embodiment of the inventive concept.

FIG. 13 is a flowchart illustrating a method of fabricating an integrated circuit, according to an example embodiment of the inventive concept.

Referring to FIG. 13, a standard cell library D10 may include information about standard cells, such as function information, characteristic information, and layout information. The standard cell library D10 may include data defining a layout of a standard cell. The data may include data defining a structure of standard cells that perform a same function and have different layouts. The data may include data defining the structure of the standard cells described with reference to FIGS. 1 to 12C.

Operations S10 and S20 may be an operation of designing an integrated circuit IC, in which layout data D30 may be generated from register-transfer level (RTL) data D11. The integrated circuit IC may be the integrated circuit 10 of FIG. 1. In operation S10, a logic synthesis operation of generating netlist data D20 from the RTL data D11 may be performed. For example, a semiconductor design tool (e.g., a logic synthesis module) may generate the netlist data D20 including a bitstream or a netlist by performing a logic synthesis with reference to the standard cell library D10 from the RTL data D11 written in hardware description language (HDL) such as very high-speed integrated circuit (VHSIC) hardware description language (VHDL) and Verilog. The standard cell library D10 may include the data defining the structure of standard cells performing a same function and having different layouts, and the standard cells may be included in the integrated circuit IC in a logic synthesis process with reference to such information.

In operation S20, a place & routing (P&R) operation of generating the layout data D30 from the netlist data D20 may be performed. The layout data D30 may have a format such as graphic database system information interchange (GDSII), and may include geometric information of standard cells and interconnections.

For example, a semiconductor design tool (e.g., a P&R module) may arrange a plurality of standard cells with reference to the standard cell library D10 from the netlist data D20. With reference to the data, the semiconductor design tool may select one of layouts of a standard cell defined by a netlist, and may arrange the selected layout of the standard cell.

In operation S20, an operation of generating interconnections may be further performed. The interconnection may electrically connect an output pin and an input pin of the standard cell and may include, for example, a conductive pattern formed in at least one metal layer and at least one via.

In operation S30, optical proximity correction (OPC) may be performed. The OPC may refer to an operation for forming a pattern of a desired shape by correcting a distortion phenomenon such as refraction caused by characteristics of light in photolithography included in a semiconductor process for fabricating the integrated circuit IC, and a pattern on a mask may be determined by applying the OPC to the layout data D30. In an example embodiment, a layout of the integrated circuit IC may be limitedly modified in operation S30, and the limited modification of the integrated circuit IC in operation S30 may be referred to as design polishing as post-processing for optimizing a structure of the integrated circuit IC.

In operation S40, an operation of manufacturing a mask may be performed. For example, as the OPC is applied to the layout data D30, patterns on a mask may be defined to form patterns formed in a plurality of layers, and at least one mask (or photomask) for forming the pattern of each of the plurality of layers may be manufactured.

In operation S50, an operation of fabricating the integrated circuit IC may be performed. For example, the integrated circuit IC may be fabricated by patterning a plurality of layers by using at least one mask manufactured in operation S40. Operation S50 may include operations S51, S53, and S55.

In operation S51, a front-end-of-line (FEOL) process may be performed. The FEOL process may refer to a process of forming individual devices such as transistors, capacitors, and resistors on a substrate in the process of fabricating the integrated circuit IC. For example, the FEOL process may include planarizing and cleaning a wafer, forming a trench, forming a well, forming a gate line, forming source and drain regions, etc.

In operation S53, a middle-of-line (MOL) process may be performed. The MOL process may refer to a process of forming a connection member for electrically connecting the individual devices generated through the FEOL process, in the standard cell. For example, the MOL process may include forming an active contact over an active region, forming a gate contact over a gate line, forming a via over the active contact and the gate line, etc.

In operation S55, a back-end-of-line (BEOL) process may be performed. The BEOL process may refer to a process of interconnecting individual devices such as transistors, capacitors, and resistors in the process of fabricating the integrated circuit IC. For example, the BEOL process may include silicidating gate, source, and drain regions, adding a dielectric, planarizing, forming holes, forming metal layers, forming vias between the metal layers, forming a passivation layer, etc. Thereafter, the integrated circuit IC may be packaged in a semiconductor package, and may be used as a component of various applications.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

While the inventive concept has been particularly shown and described with reference to embodiments thereof, it will be understood that various changes in form and details may be made therein without departing from the scope of the following claims.

What is claimed is:

1. An integrated circuit comprising:
   a plurality of standard cells comprising first and second standard cells arranged adjacent to each other in a first direction; and
   first, second, and third metal layers sequentially stacked in a vertical direction, wherein:
   at least one power segment is arranged in a region where at least one of the first standard cell or the second standard cell is arranged,
   the at least one power segment is configured to provide power to the plurality of standard cells and comprises a pattern of the third metal layer extending in a second direction,
   the first metal layer comprises a power line configured to transmit power to the plurality of standard cells, and
   the at least one power segment is shorter in the second direction than the power line.

2. The integrated circuit of claim 1, wherein the at least one power segment is arranged at a cell boundary between the first standard cell and the second standard cell.

3. An integrated circuit comprising:
   a plurality of standard cells comprising first and second standard cells arranged adjacent to each other in a first direction, wherein a cell height of the first standard cell in the first direction is greater than a cell height of the second standard cell in the first direction;
   first, second, and third metal layers sequentially stacked in a vertical direction; and
   a power line adjacent a cell boundary of the first standard cell, wherein:
   at least one power segment is arranged in a region where at least one of the first standard cell or the second standard cell is arranged, the power line is configured to provide power to the plurality of standard cells and comprises a pattern of the third metal layer extending in the second direction, and the power line is longer than the at least one power segment in the second direction.

4. An integrated circuit comprising:

a plurality of standard cells comprising first and second standard cells arranged adjacent to each other in a first direction; and first, second, and third metal layers sequentially stacked in a vertical direction, wherein:

at least one power segment is configured to provide power to the plurality of standard cells and comprises a pattern of the third metal layer extending in a second direction, the at least one power segment comprises a first power segment and a second power segment, the first power segment is arranged adjacent to a cell boundary between the first and second standard cells in a first region where the first standard cell is arranged, the second power segment is arranged adjacent to the cell boundary in a second region where the second standard cell is arranged, and the first and second power segments are electrically connected to different first and second patterns of the second metal layer, respectively.

5. The integrated circuit of claim 1, further comprising a via configured to electrically connect a pattern of a fourth metal layer to a pattern of the second metal layer, wherein the fourth metal layer is stacked on the third metal layer opposite the second metal layer.

6. The integrated circuit of claim 1, further comprising a via configured to electrically connect two or more tracks included in a same metal layer.

7. The integrated circuit of claim 1, wherein the third metal layer comprises power lines configured to transmit power to the plurality of standard cells, and a subset of the power lines of the first metal layer is not aligned with the power lines of the third metal layer in a direction in which the first, second, and third metal layers are stacked.

8. The integrated circuit of claim 1, comprising:

a plurality of tracks on which a plurality of patterns extending in the second direction, wherein a first track among the plurality of tracks comprises the at least one power segment and a signal segment, the at least one power segment comprises a pattern provided in a first portion of the first track, and the signal segment is configured to transmit signals and comprises a pattern formed in a second portion of the first track.

9. The integrated circuit of claim 8, wherein second tracks among the plurality of tracks comprise patterns configured to transmit signals to the plurality of standard cells, and a width of the patterns of the second tracks in the first direction is different from a width of the patterns of the first track in the first direction.

10. The integrated circuit of claim 8, wherein respective widths of the signal segment and the at least one power segment are different from each other.

11. The integrated circuit of claim 8, wherein patterns of the plurality of patterns on the first track are within a cell boundary of a corresponding standard cell among the plurality of standard cells.

12. The integrated circuit of claim 8, wherein patterns of the plurality of patterns on the first track are on a cell boundary between a pair of the standard cells that are adjacent to each other in the second direction.

13. The integrated circuit of claim 8, wherein cells having a same cell height in the first direction among the plurality of standard cells are arranged adjacent to each other.

14. The integrated circuit of claim 3, wherein the at least one power segment is arranged at a cell boundary between the first standard cell and the second standard cell, and is shorter in the second direction than a power line that is configured to provide power to the plurality of standard cells.

15. The integrated circuit of claim 3, further comprising a via configured to electrically connect a pattern of a fourth metal layer to a pattern of the second metal layer, wherein the fourth metal layer is stacked on the third metal layer opposite the second metal layer.

16. The integrated circuit of claim 3, further comprising a via configured to electrically connect two or more tracks included in a same metal layer.

17. The integrated circuit of claim 4, wherein the at least one power segment is arranged at a cell boundary between the first standard cell and the second standard cell, and is shorter in the second direction than a power line that is configured to provide power to the plurality of standard cells.

18. The integrated circuit of claim 4, further comprising a via configured to electrically connect a pattern of a fourth metal layer to a pattern of the second metal layer, wherein the fourth metal layer is stacked on the third metal layer opposite the second metal layer.

19. The integrated circuit of claim 4, further comprising a via configured to electrically connect two or more tracks included in a same metal layer.

20. The integrated circuit of claim 4, wherein each of the first metal layer and the third metal layer comprises power lines configured to transmit power to the plurality of standard cells, and a subset of the power lines of the first metal layer is not aligned with the power lines of the third metal layer in a direction in which the first, second, and third metal layers are stacked.

\* \* \* \* \*